US010073996B2

(12) United States Patent
Ferrer Alós

(10) Patent No.: US 10,073,996 B2
(45) Date of Patent: Sep. 11, 2018

(54) DEVICE WITH RFID WINDOW THAT COUPLES TO THE MOUTH OF A SHOPPING CART OR ANOTHER CONTAINER AND METHOD OF IDENTIFICATION

(71) Applicants: Javier Ferrer Alós Modelos Informáticos, S.L., Rocafort (ES); Portichuelo Fotovoltaica, S.L., Valencia (ES); Ismael Herreros Marchante, San Fernando de Henares (ES); Iván Francisco Jimenez Morales, Valencia (ES)

(72) Inventor: Javier Ferrer Alós, Rocafort (ES)

(73) Assignees: Javier Ferrer Alós Modelos Informáticos, S.L., Rocafort (ES); Portichuelo Fotovoltaica, S.L., Valencia (ES); Ismael Herreros Marchante, San Fernando de Henares (ES); Iván Francisco Jimenez Morales, Valencia (ES); Vicente Campos Tena, Valencia (ES); Ramón Dolz García, Valencia (ES)

( * ) Notice: Subject to any disclaimer, the term of this patent is extended or adjusted under 35 U.S.C. 154(b) by 0 days.

(21) Appl. No.: 15/690,706

(22) Filed: Aug. 30, 2017

(65) Prior Publication Data

US 2018/0060618 A1    Mar. 1, 2018

(30) Foreign Application Priority Data

Aug. 31, 2016   (ES) .................................... 201631138

(51) Int. Cl.
*G06K 15/00* (2006.01)
*G06K 7/10* (2006.01)

(52) U.S. Cl.
CPC ............................... *G06K 7/10356* (2013.01)

(58) Field of Classification Search
CPC ... G06Q 30/06; G06Q 20/341; G07C 9/00103
(Continued)

(56) References Cited

U.S. PATENT DOCUMENTS 7,443,295 B2    10/2008   Brice et al.
8,143,997 B2 *   3/2012   Marr, III ................ H04Q 9/00
                                                    235/383

(Continued)

FOREIGN PATENT DOCUMENTS

WO       2016018895 A1    2/2016

*Primary Examiner* — Ahshik Kim
(74) *Attorney, Agent, or Firm* — The Webb Law Firm

(57) ABSTRACT

Device with RFID radio frequency identification window that couples to the mouth of a shopping cart, or another container, that includes a frame with a window horizontally crossed by a plurality of light rays coming from a light curtain, an infrared sensor configured to detect an object that approaches the window, an RFID reader configured to detect and identify codes contained in RFID labels incorporated in the objects that enter or exit the basket of the cart through the window, UHF antennas, the radiation beams of which cover the space of the window, configured to be activated once the infrared sensor detects the object that approaches; and a processor configured to store the objects that stay inside the cart in an electronic shopping list.

16 Claims, 21 Drawing Sheets

(58) Field of Classification Search
USPC .......................................................... 235/383
See application file for complete search history.

(56) References Cited

U.S. PATENT DOCUMENTS

| | | |
|---|---|---|
| 2003/0015585 A1 | 1/2003 | Wike, Jr. et al. |
| 2006/0208072 A1 | 9/2006 | Ku et al. |
| 2008/0149710 A1 | 6/2008 | Silverbrook et al. |
| 2009/0230643 A1 | 9/2009 | Eckert et al. |
| 2014/0164176 A1* | 6/2014 | Kitlyar ............... G06Q 30/0633 705/26.8 |
| 2015/0006319 A1* | 1/2015 | Thomas ............. G06Q 30/0633 705/26.8 |
| 2016/0180670 A1* | 6/2016 | Swope ................ G08B 13/246 340/568.5 |
| 2017/0186072 A1* | 6/2017 | Clark ................. G06Q 30/0633 |
| 2017/0221132 A1 | 8/2017 | Howell |

* cited by examiner

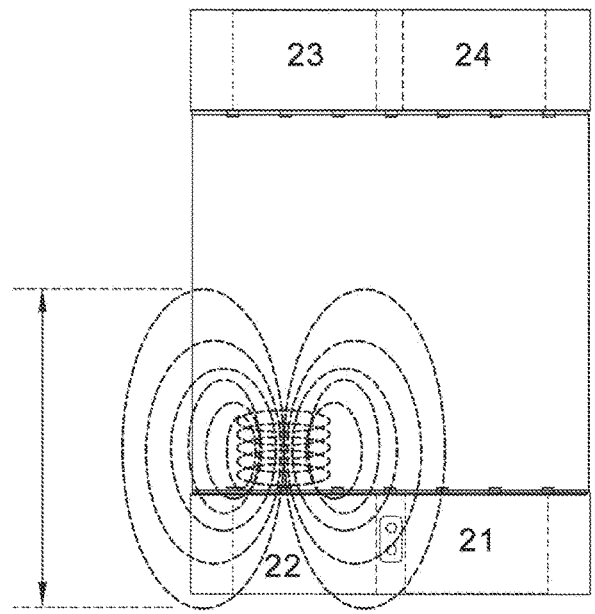
FIG. 11A
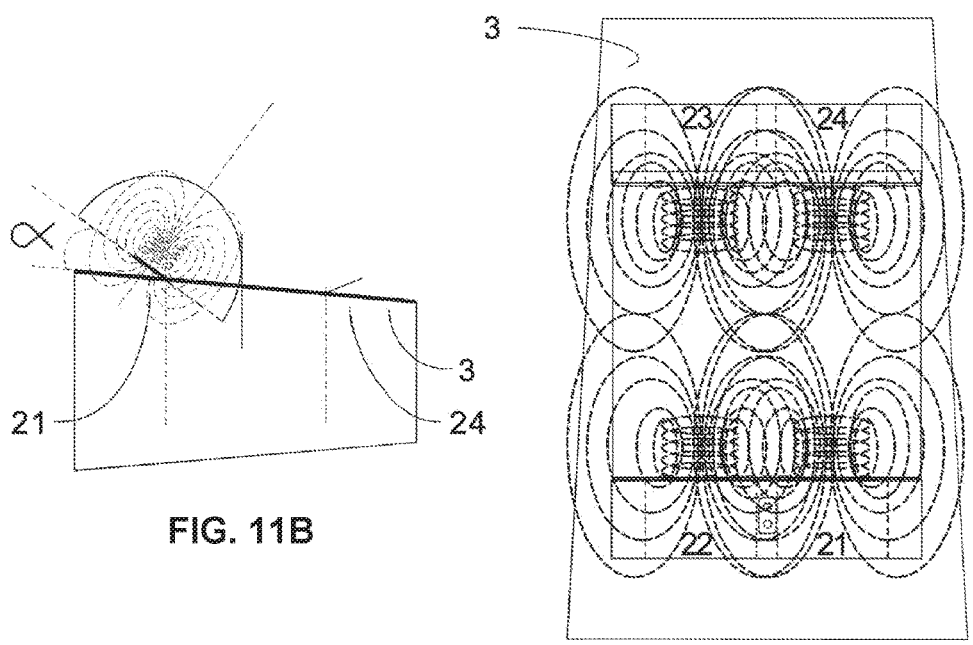
FIG. 11B
FIG. 11C

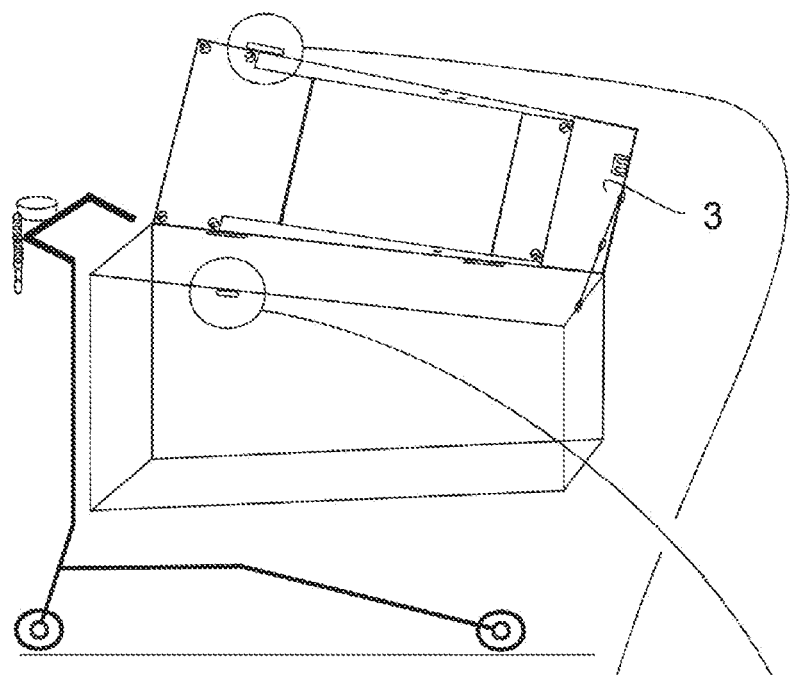
FIG.12
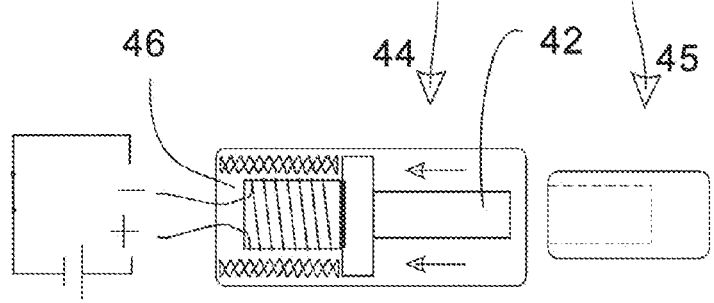
(a)
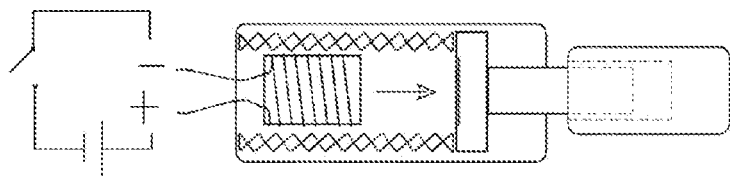
(b)

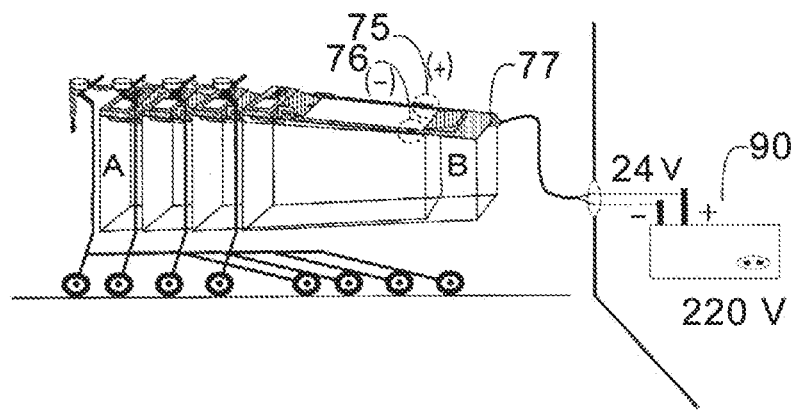
FIG. 20A
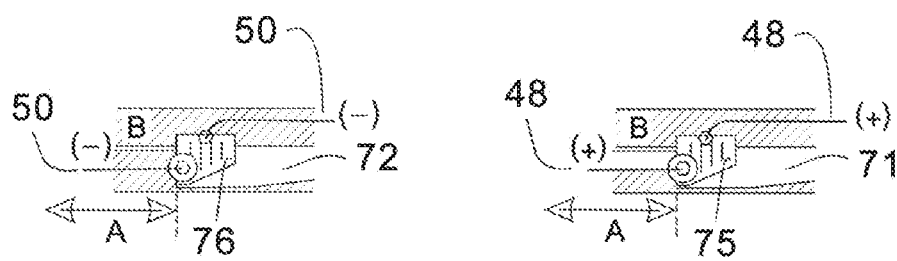
FIG. 20B
FIG. 20C
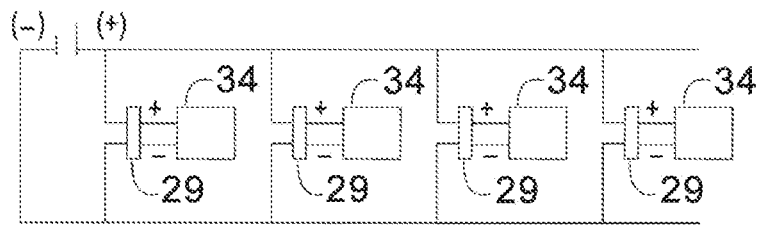
FIG. 20D

DEVICE WITH RFID WINDOW THAT COUPLES TO THE MOUTH OF A SHOPPING CART OR ANOTHER CONTAINER AND METHOD OF IDENTIFICATION

CROSS-REFERENCE TO RELATED APPLICATION

This application claims priority to Spanish Patent Application No. P201631138 filed Aug. 31, 2016, the disclosure of which is hereby incorporated in its entirety by reference.

OBJECT OF THE INVENTION

The object of the present invention relates to a device with RFID (Radio Frequency IDentification) window, that couples to a shopping cart or in another container, with the ability to detect the introduction or removal of products with RFID labels in an efficient and sufficiently secure manner, such as to enable the automated payment or the mere recording of the electronic shopping list that the very device with RFID window computes, such that the list of the identified products in an electronic file corresponds with the products in the cart, or in another container, that have passed through the window of the device, and to the method of identification.

Technical Problem to be Solved and Background of the Invention

Since the attempt of the Walmart company (U.S.A.) at the beginning of this century to incorporate radio-frequency product identification (RFID) technology in the food sector, significant inventive efforts have been made to incorporate said identification technology inside the UHF (Ultra High Frequency) spectrum (ETSI—European Telecommunications Standard Institute,—860-960 MHz band, FCC—Federal Communications Commission of the United States—902-928 MHz band) in order to achieve automated purchasing with shopping carts inside supermarkets.

There are multiple advantages that the present invention offers to the food distribution sector (supermarkets, stores, etc.), such as a drastic decrease in sales costs, reutilization of personnel costs at cash registers for other tasks that add value, elimination of lines at the cash registers due to removing the need of the client to unload the cart, having the cashier scan products and reload the cart with the scanned products, checking perishable products on a unit-by-unit basis in real time with the EPC code (Electronic Product Code) stored in the RFID tags, etc.

Until now, the attempts to efficiently incorporate RFID in the purchase of products has not created minimum levels of security in the identification of products when the user incorporates them into their cart. Various implementations until now have produced an unreliable electronic shopping list for the final automated payment without the intervention of an assistant at the register.

The following patent documents are known in the state of the art: US U.S. Pat. No. 7,443,295 B2, US 2009230643 A1, US 20080149710 A1, US 20060208072 A1, US 20030015585 A1 and PCT/US 2015/042438, where in some of these the provided solutions coincide with the placement of UHF antennas in one or all of the side surfaces of the cart at different heights, including the additional placement of an antenna in the bottom of the cart in order to improve the reading security of the RFID tags, which, in any case, is not produced with the necessary efficiency; and in other patents, the mere indication of the use of RFID sensors without the necessary description in the figures of the placement of the UHF or SHF antennas in the mobile cart or basket, which is one of the critical factors for the efficiency of the RFID technology. In all cases, occasional reading deficiencies, inherent in RFID technology in an excessively open cart geometry given the level of reliability that is required, create from the shopping list (reading failures) that makes payment automation unfeasible at a level of deployment in supermarkets.

The growth of electronic commerce has obligated large logistics operators to develop novel picking or order preparation techniques, such as the use of robots by Amazon (Kiva Systems, 2014) to move the product shelves to the tables of the order pickers, which no longer go down the aisles with carts, but rather work by introducing the articles that come to them in the mobile shelves into an order box. Even so, the order pickers still need a hand at all times in order to hold a barcode gun with the goal of scanning each product, which makes it impossible to have both hands free in order to better carry out the process, which in the case of electronic commerce in the food sector is especially inefficient, in that in one order box a high number of products must fit which inevitably requires using both hands. For logistics operators that continue to perform picking with pickers that go down aisles with a cart, the present invention offers the same automatic recording advantages of the products introduced without scanning each product.

The advantages that the present invention offers in the preparation of orders in electronic commerce with products tagged with RFID tags are: automatic identification and recording of the articles that pass through the window of the device, and that end up being introduced into the basket of a cart of directly in the box of an order; free hands of the worker, used to fit the products without needing to scan each article; and real-time communication with the central system of the load of the articles in the basket of a cart or in the box of an order.

By means of the gradual decrease of the costs of RFID tags with magnetic ink (chipless) and the development of the Internet of Things (IoT), the proliferation of the identification of products with RFID tags will start to universally substitute the current barcode. In that context, the present invention offers advantages in any commercial, manufacturing or management environment, where an efficient system is required for identifying and recording products with RFID tags (food, manufactures, postal packages and envelopes, bags for transporting money, etc.) that are introduced into a container of small dimensions: basket of a cart, box, etc.

Thus, the present invention solves the previously mentioned problems of the state of the art, in particular in the food distribution sector, the one most lagging in the adoption of RFID technology, wherein the prognostics of the consultancies warn that the change from product identification with barcodes to RFID tags will happen in the next few years due to the decrease of the cost of an RFID tag to around one cent.

DESCRIPTION OF THE INVENTION

In a first aspect of the invention, a device is provided with RFID identification window that couples to the mouth of a shopping cart, such that it comprises a frame that comprises a window (preferably with dimensions of 400×400 mm) horizontally crossed by a plurality of light rays coming from a light curtain (the light curtain should be arranged such that the light rays of said light curtain cover the entire surface of the space delimited by the window); an infrared sensor located on any one of the sides of a framework of the window; an RFID reader connected to at least two UHF antennas where the UHF antennas are located on opposite sides of the framework of the window and inclined with an angle "α" over the frame and the radiation beams thereof cover the space of the window; a processor connected to the infrared sensor, to the light curtain and to the RFID reader, where the infrared sensor is configured to detect at least one object that approaches the window; the UHF antennas are configured to be activated once the infrared sensor detects the at least one object that approaches; the RFID reader is configured to detect and identify a code (EPC, or another type) contained in RFID tags incorporated in the objects that enter or exit the basket of the cart through the window; and the light curtain is configured to detect any object that passes through it, and the processor is configured to store the objects that stay within the cart on an electronic shopping list.

The frame comprises a first power supply circuit configured to electrically disconnect the device with RFID window when a plurality of carts is stacked that comprises a separator part, and a guide that comprises on the inside thereof a spring and a conducting metallic part, where upon stacking the carts, the separator part of a first stacked cart is configured to be introduced into the guide of a second stacked cart, compressing the spring with the metallic conducting part and in this way opening said first power supply circuit. Additionally, the frame comprises a second power supply circuit configured to recharge a supply battery of the device with RFID window when a plurality of carts are stacked, which comprises an electrical connector, a groove connected to a positive pole and a groove connected to a negative pole, and a metallic tab connected to a positive pole and a metallic tab connected to a negative pole, where the metallic tab connected to a positive pole and the metallic tab connected to a negative pole of a first stacked cart are configured to be respectively connected to the groove connected to a positive pole and to the groove connected to a negative pole of a second stacked cart, and in turn the electrical connector of the first stacked cart is configured to be connected to an external power source.

The UHF antennas are configured to be activated during the detection of the object by the infrared sensor and while the light curtain is interrupted (therefore, continuous radiation is not produced by the antennas, thus preventing rapid battery consumption and environmental radiation overload that may produce undesired readings of neighboring RFID tags), and are placed on a horizontal plane of the frame with an inclination angle α with a value comprised between 0 and 26 degrees and have a radiation beam width β, with respect to the vertical plane thereof and the horizontal plane thereof, with a value comprised between 80 and 150 degrees.

The frame further comprises an LCD screen (Liquid Crystal Display) configured for displaying information about the objects introduced into the cart, an active RFID tag configured for the identification and localization of the cart in real time, a speaker configured to emit vocalized information of interest for the user of the cart, and a passive RFID tag configured for the identification of the cart in a payment area.

The device with RFID window comprises at least four UHF antennas, selected from those arranged two by two, on opposite sides of the framework of the window, and arranged one on each of the sides of the framework of the window.

In a second aspect of the present invention, a shopping cart is provided that carries the device with RFID window of the first aspect of the invention coupled to it. In a preferred embodiment, the cart comprises a base, a front wall, two side walls and a rear wall where the rear wall comprises two side panels configured to be opened laterally and an upper panel configured to be opened vertically, in order to be able to stack a cart.

In a third aspect of the invention, an automatic payment point is provided with identification by RFID radio frequency comprised by the shopping cart defined in the second aspect of the invention. In one embodiment, the automatic payment point comprises:
    a bar structure, in which a cart is able to be placed;
    a payment station that comprises:
        a computer connected to a local server;
        an LCD screen;
        means of electronic payment;
        an illuminating stoplight;
        a receipt printer; and,
        an RFID tag reader for reading an identifying RFID code of a cart;
    a collapsible bar connected to the computer, where the collapsible bar blocks/enables the exit of the cart from the bar structure according to instruction received from the computer;
    a floor scale connected to the computer, where the floor scale measures the weight of the cart located in the bar structure;
where the computer sends to the local server: an identifying number of the station, the identifying RFID code of a cart, the weight of the cart; and where the computer receives instruction from the local server with which said computer actuates the collapsible bar. The instruction that the computer receives is that of enabling the exit of the cart if the weight calculated by the scale minus the weight of the cart is equal or close to the weight calculated by the central server based on the weights of the products contained in the cart.

In a fourth aspect of the invention, a method of identification by RFID radio-frequency is provided that, by means of the device with RFID window, is able to identify the products that pass through the RFID window. The method of identification by RFID comprises the following phases: detecting at least one object that approaches the window of the device with RFID window by means of the infrared sensor; in response to the detection of the at least one object activating the UHF antennas; detecting and identifying a first code (EPC, or another type) of each RFID tag of the at least one object by means of the RFID reader and store said code (EPC, or another type) in a file of the processor; in response to the interruption and restoration of the light curtain detecting and identifying a second RFID tag code (EPC, or another type).

In the case of a second RFID tag code (EPC, or another type) not being detected, an object entry into the cart is then determined, corresponding to the first RFID tag code stored.

In the case of a second RFID tag code (EPC, or another type) being detected, it is determined whether said second RFID tag code (EPC, or another type) is identical to the first RFID tag code (EPC, or another type) where in the case of them being identical, an object exit is determined and the object corresponding to the first RFID tag code (EPC, or another type) stored is eliminated from the file; and in the case of them being different, an object entry corresponding to the RFID tag code (EPC, or another type) is determined and at the same time an object exit is determined, and the object corresponding to the second RFID tag code (EPC, or another type) stored is eliminated from the file.

In the case of a first RFID tag code (EPC, or another type) not being detected and if a second RFID tag code (EPC, or another type) is detected, an object exit is determined and the object corresponding to said second RFID tag code (EPC, or another type) stored is eliminated from the file.

In a fifth aspect of the invention, a device is provided with RFID radio frequency identification window that couples to a structure configured for housing a container. The device comprises the same characteristics as the device of the first aspect of the invention.

In a sixth aspect of the invention, a device is provided with RFID radio frequency identification window that couples to a container. The device comprises the same characteristics as the device of the first aspect of the invention.

In a seventh aspect of the invention, a structure for a container is provided that comprises the device according to the fifth aspect of the invention.

In an eighth aspect of the invention, a container is provided that comprises the device according to the sixth aspect of the invention.

The device with RFID radio frequency identification window described in any aspect of the invention and for any embodiment can be applied to many structures and/or containers (boxes, etc.) for which the products contained in the containers are to be identified. For this reason, the embodiments and aspects shown in the present description should not limit the application of the invention to other containers with a similar functional nature.

In the aspects and embodiments shown throughout all the description, the use of radio frequency (RFID) in the UHF 860-928 band was described without this embodiment limiting the use of other frequencies such as 2.4 GHz, or even SHF (Super High Frequency). For the SHF frequency, SHF antennas are used. In the same way, the present invention is not limited to tags with RFID chips integrated in different PCB (Printed Circuit Board) technologies; the design thereof is equally effective with the emerging technology of chipless RFID tags printed with magnetic inks. Likewise, the use of the EPC code (Electronic Product Code) that is used in this exemplary embodiment is not limiting, it being able to be any other RFID encoding standard.

As stated above, the object of the present invention is focused exclusively on an RFID window device coupled to a shopping cart, or to another type of container, which efficiently and safely solves the recording of the electronic list of products that a user is introducing or removing of his/her shopping car when performing a conventional purchase practice without worrying about scanning any item. The original integration and arrangement of the sensors of the present invention represent an advance in the state of the art for the attainment of that objective. In that sense, other devices that can increase the functionality of the carriage with RFID window have been excluded from the description but which, since they are currently in the state of the art, are not included in order not to divert attention from the invention such as: an LCD screen 10 inches or more for better presentation of the electronic list, presentation of offers according to the area of passage, etc; a special bay in the device frame with RFID window to deposit a user's smartphone, connecting the minicomputer of the device with an ad hoc App application via a short-distance wireless communication with Bluetooth, or Near Field Communication (NFC) with the purpose of interacting with the user with data and information that may be of his/her interest.

DESCRIPTION OF THE FIGURES

To complete the description and for the purpose of facilitating a better understanding of the features of the invention, this specification is accompanied by a set of drawings, as an integral part thereof, where by way of non-limiting example, the following has been represented:

FIGS. 11A-11C show a near-field radiation diagram of the vertical and horizontal plane with antennas of 155×100 mm, beam width of $\beta=80°$ in both planes, an antenna inclination of $\alpha=26°$ and a window of 400×400 mm.

FIG. 12 shows a side view of a cart with the device with RFID window with the detail of the cabling of the solenoid that extends or retracts a bolt for the opening or closing of the device with RFID window in the cart.

FIGS. 20A-20D show detail drawings of the electrical interconnection mechanism of the frames of the device with RFID window with stacked carts for the connection of the batteries thereof in parallel, preparing the stack of carts for recharging with an external power source.

Below is a list of the different elements shown in the figures that are included in the invention:
1 Device with RFID window.
2 Cart with wheels.
3 Frame.
4,5 Covers.
6 Window.
7 Housing.
8 Fixed structure
11 Active RFID tag.
12 Passive RFID tag.
20 Inclined rectangular protuberances.
21,22 Rear UHF antennas.
23,24 Front UHF antennas.
27 SMA connector.
29 Protection circuit module (PCM).
30 LCD screen.
31 Processor.
32 Wi-Fi adapter.
33 RFID reader.
34 Battery.
35 Speaker.
36 Infrared sensor.
37 Linear emitter/receiver.
38 Linear reflector.
39 Light curtain.
40 Positive cable that supplies power to the screen, to the processor and to the RFID reader.
41 Hinges.
42 Bolt.
43 Handle.
44 Casing.
45 Catch.
46 Solenoid.
47 Extendable arm.
48 Positive cable.
49 Cable with two wires.
50 Negative cable.
51 Data communication cable.
52 Power cable.
61,62 Side panels.
63 Upper panel.
65 Stops.
67 Side panel hinges.
71 Groove connected to a positive pole.
72 Groove connected to a negative pole.
73 Guide.
74 Separator part.
75 Metallic tab connected to a positive pole.
76 Metallic tab connected to a negative pole.
77 Electrical connector.
78 Spring.
79 Conducting metallic part.
90 External power source.
91 Product entry.
92 Product exit.
93 90° rotation of a collapsible bar.
94 Product entry or exit.
95 Movement of shelves.
100 Product.
101 Table.
102 Mobile shelves of product.
103 Box or container.
104 Display of the central server or HOST.
121 Local Network.
122 Wireless Access Point.
123 Local Network data communication cable.
130 Bar structure.
131 Impediment bar.
132 Collapsible bar.
133 Shaft of a rotation motor.
140 Station of the payment devices.
141 Screen.
142 Electronic payment card reader.
143 Illuminating stoplight.
144 Receipt printer.
145 RFID reader.
146 Communication cable between a payment station and a floor scale.
147 Communication cable between a payment station and a rotation motor.
150 Floor scale.
200 Electromagnetic radiation.
201 Wireless Wi-Fi communication radiation or similar
311 File.
360 Reflected light.

DETAILED DESCRIPTION OF THE INVENTION

Figure 1:
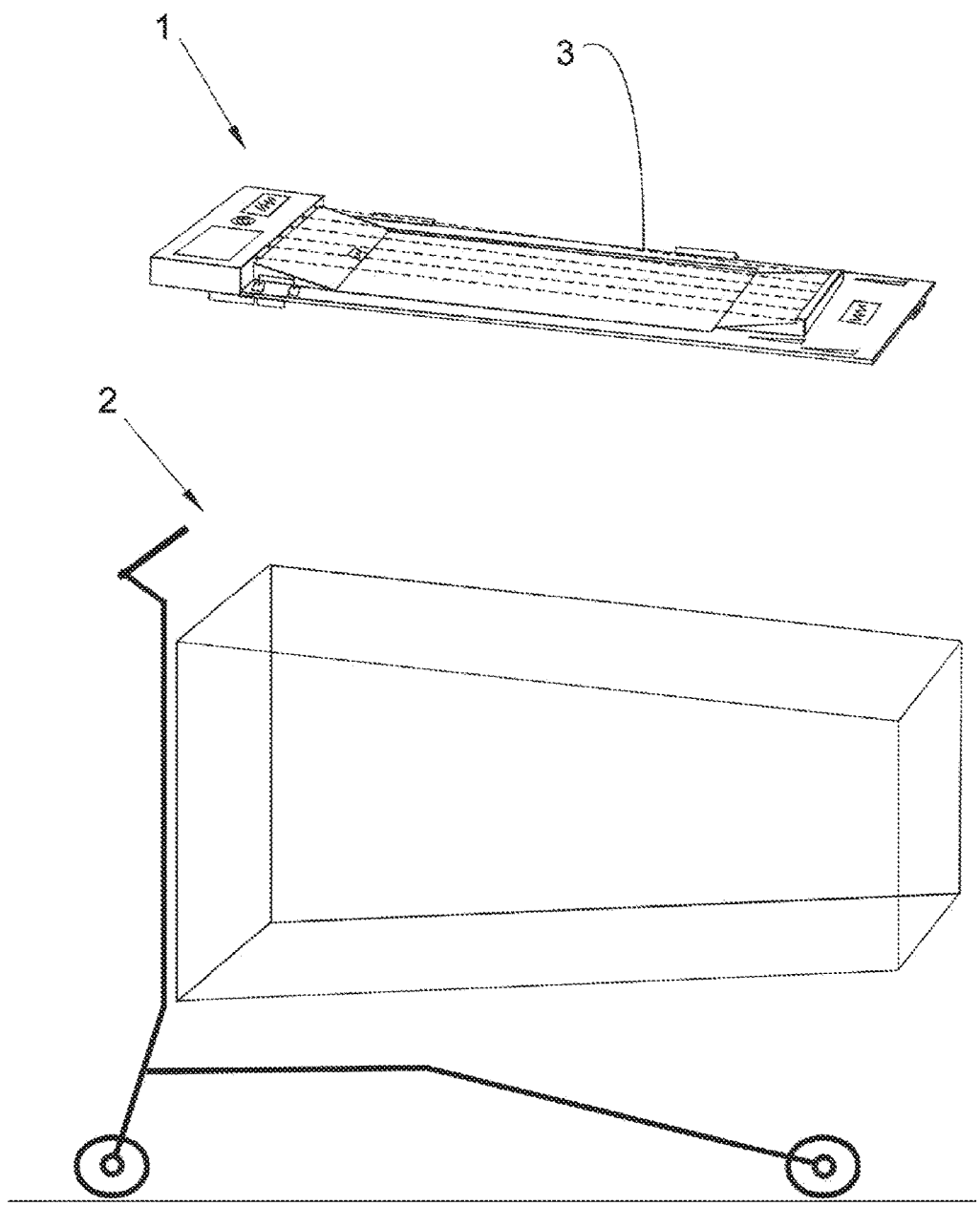
FIG. 1 shows a 3D side view of a conventional cart and another separate side view of the device with RFID window.
Figure 2:
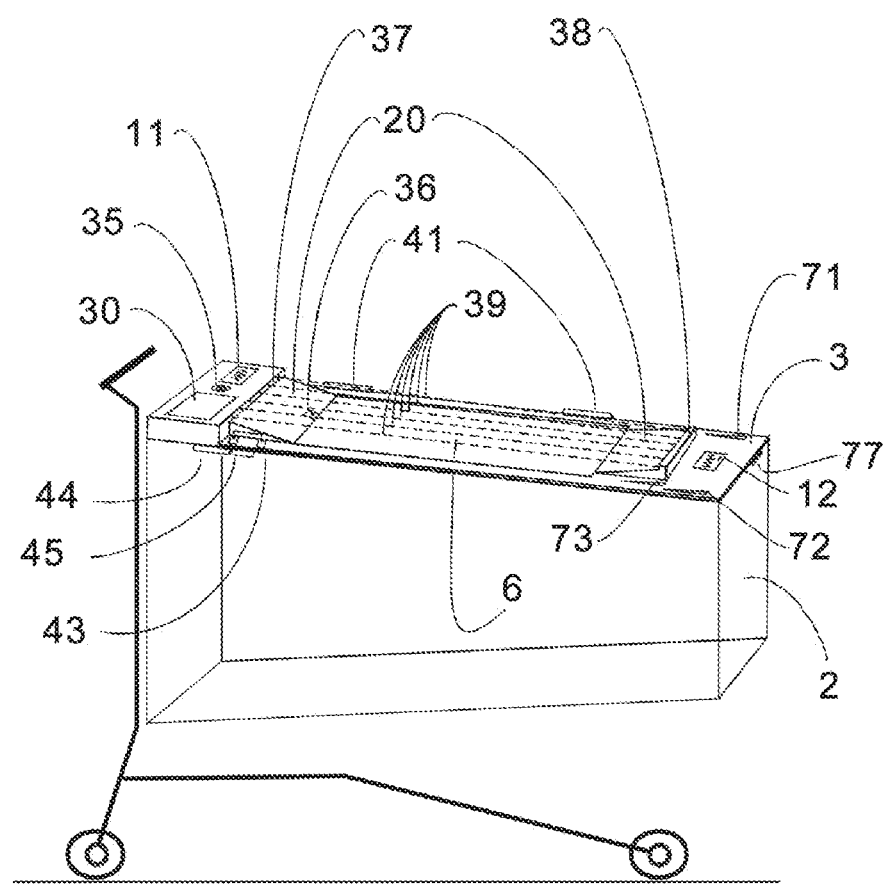
FIG. 2 shows the previous figure with the device with RFID window already coupled, in a roof-like manner, to the mouth of the cart.

In FIG. 2 a conventional cart 2 with wheels is seen to which the device with RFID window 1 of the present invention has been coupled in a roof-like manner.

The device with RFID window 1 comprises a frame 3 that incorporates two hinges 41, which fasten said frame 3 to the cart 2 and enable the user to rotate and raise the frame 3 by means of a handle 43 to the limit of an extendable arm 47 (up to an approximate angle of 105°) with respect to the opening surface of the cart 2. The frame 3, in turn, stays locked in order to lift it with the handle 43 while a bolt 42 stays jammed in a catch 45 pushed by a solenoid 46 that is in the casing 44. The bolt 42 slides or retracts in order to lock or unlock the opening of the device with RFID window 1 with respect to the cart 2.

The frame 3 has a window 6 in the central area thereof that enables the direct access to the inner part of the basket of the cart 2. The surface of the space that the window 6 delimits is horizontally crossed by a plurality of light rays coming from the beams of a light curtain 39 that acts as a barrier that is sensitive to the passage of any object towards the inside or the outside of the cart 2 through the window 6. On one of the sides of the framework of the window 6 an infrared sensor 36 is arranged that comprises an emitter diode and a receiver diode, next to each other. On both opposite sides of the framework of the window 6 it can be seen how the frame 3 has two inclined rectangular protuberances 20 that house on the inside thereof at least two UHF antennas 21, 24, an antenna in each inclined rectangular protuberance 20, although preferably there are four UHF antennas 21, 22, 23, 24. The inclined rectangular protuberance 20 located in the initial end of the frame 3 (close to the handle 43) houses the rear UHF antennas 21, 22, while the final end houses the front UHF antennas 23, 24. Obviously, the light curtain 39 can be arranged in any part of the framework, above or below the antennas, even in the sides where there are no antennas, as long as on two of the opposite sides thereof they cover the space that the window 6 delimits. The UHF antennas 21, 22, 23, 24 can also be arranged one on each side of the framework of the window 6.

The frame 3 also comprises a housing 7 where the electronic components are integrated such as an LCD screen 30 to display information about the products introduced into the basket of the cart 2, sales, and any other incident or event of interest to the user of the cart 2 in their purchasing activity, a speaker 35 and an active RFID tag 11 that emits a radio-frequency signal that is received by receiver antennas in the upper part of the supermarket or store, for the identification and positioning of the cart 2 in real time with the RTLS (Real-time locating systems), through a Mobile Asset Tracking system in a central computer.

Figure 3A:
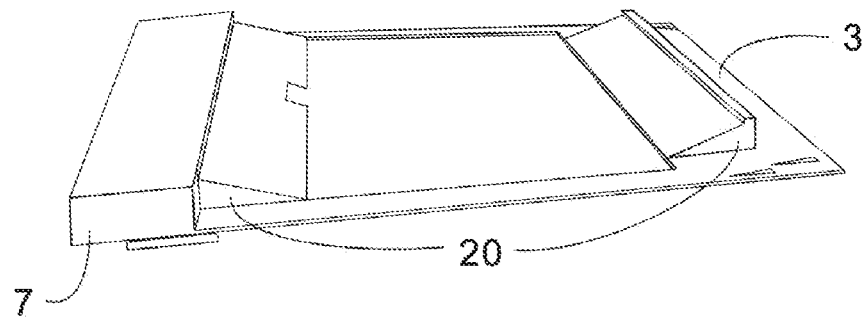
FIGS. 3A and 3B show 3D side views of the frame, and the final roof-like coupling thereof in a conventional cart. It is seen how the light curtain is arranged over the UHF antennas.
Figure 3B:
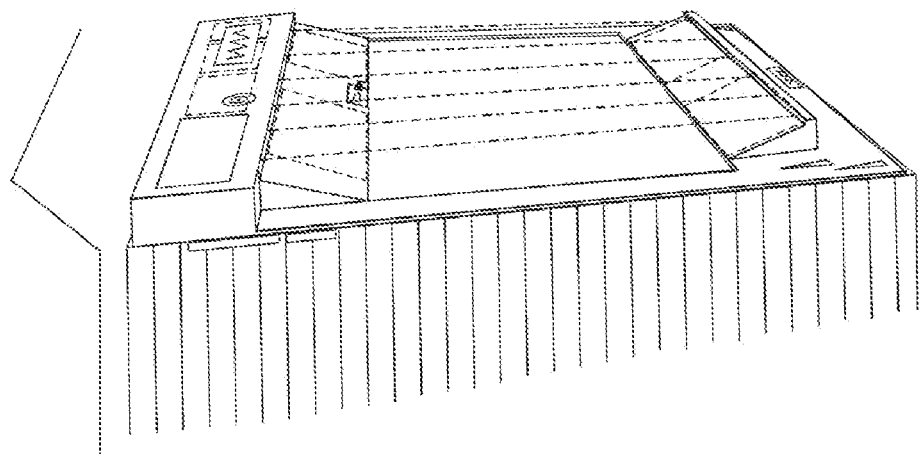
Figure 4:
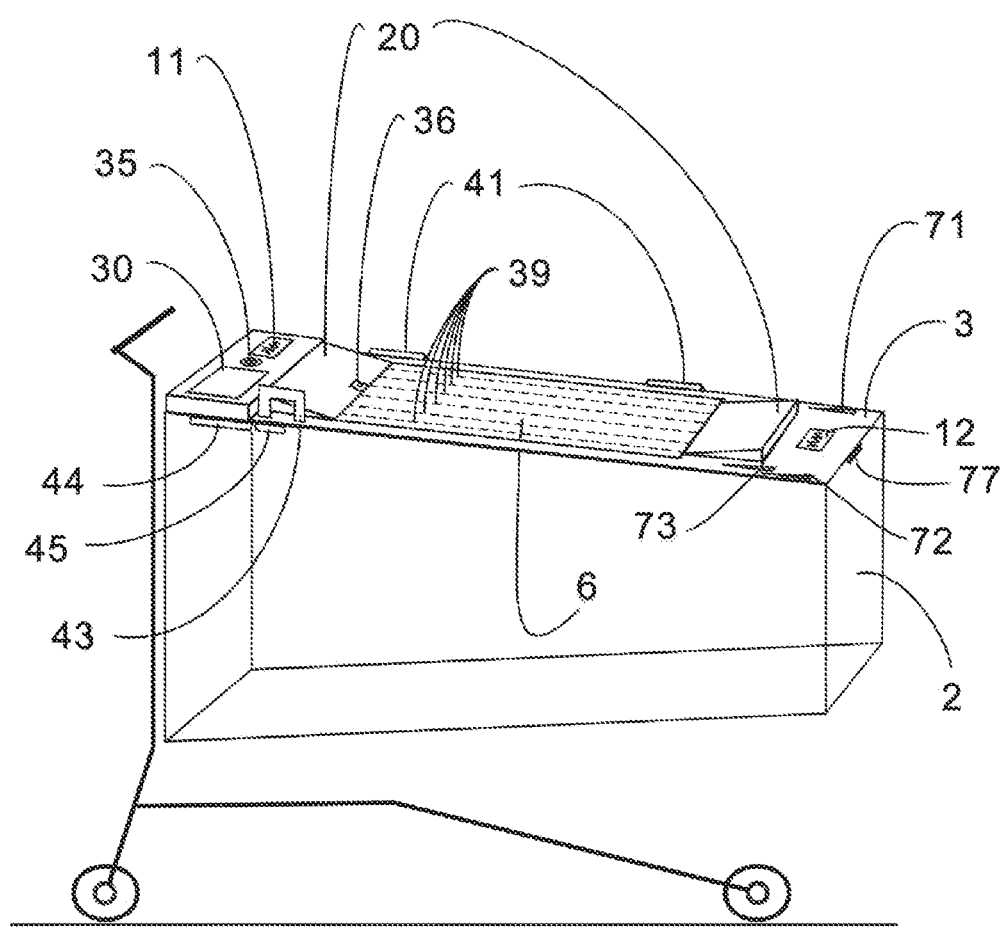
FIG. 4 shows another embodiment in which it is seen how the light curtain is arranged over the very framework of the window, instead of being arranged over the UHF antennas.

As seen in FIG. 3A, the frame 3 is made up of a single piece with plastic material made of polyethylene, methacrylate or another with similar characteristics.

Figure 5:
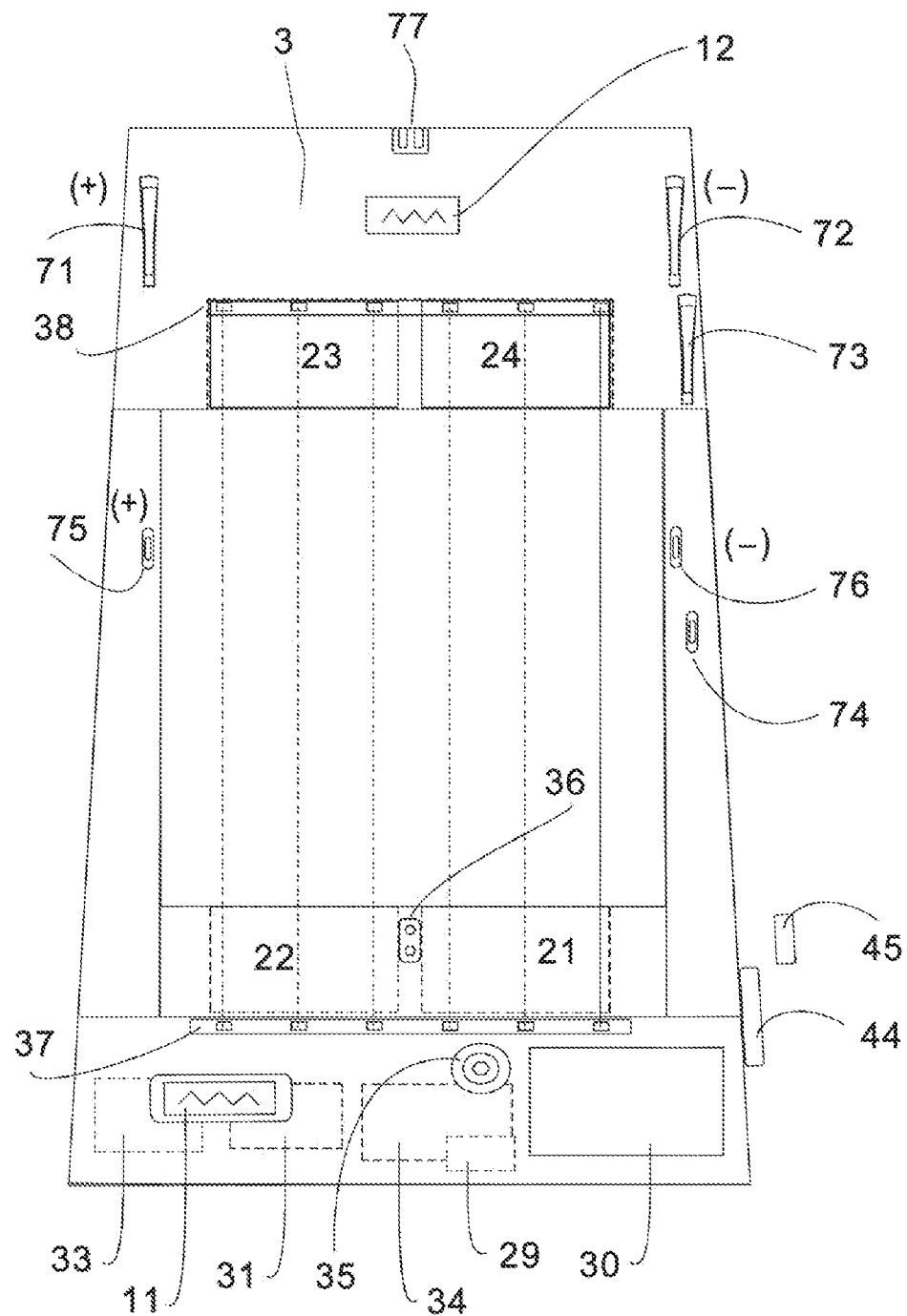
FIG. 5 shows a plan view of the upper portion of the device with RFID window with the location and localization of the components thereof.

FIG. 5 shows a layout drawing of the upper portion of the frame 3 with the electronic components thereof visible to the user: the LCD screen 30, the speaker 35, the active RFID tag 11, the passive RFID tag 12 for the identification of the cart 2 at a short distance in the payment area; the infrared sensor 36 with the two diodes thereof, the groove connected to a positive pole 71, the groove connected to a negative pole 72 and the guide 73 that houses a spring 78 on the inside.

The dimensions and geometry of the window 6, preferably square, of approximately 400×400 mm, the position and inclination of the UHF antennas 21, 22, 23 and 24 below the frame 3 and the angle and reach of the infrared sensor 36 make it so that the device with RFID window 1 of the present invention has maximum efficiency for detecting the passage of products with an RFID tag through the window 6 thereof. The window 6 can also be rectangular with dimensions that are close to 400×400 mm which is the most optimized window 6 size for reading RFID tags with two antennas, both for resonating with the electromagnetic or "far field" radiation from the UHF antennas of the RFID reader 33, as well as for the inductive coupling with the magnetic field at a short distance from the UHF antennas or "close field". The range of the dimensions of the sides of the rectangle of the window 6 that determine both the distance between the rear antennas 21, 22 and the front antennas 23, 24, as well as the width of the window 6, is between 330 and 550 mm or more, according to the dimensions of the cart 2, the exemplary embodiment of the present invention being 400×400 mm.

Figure 6:
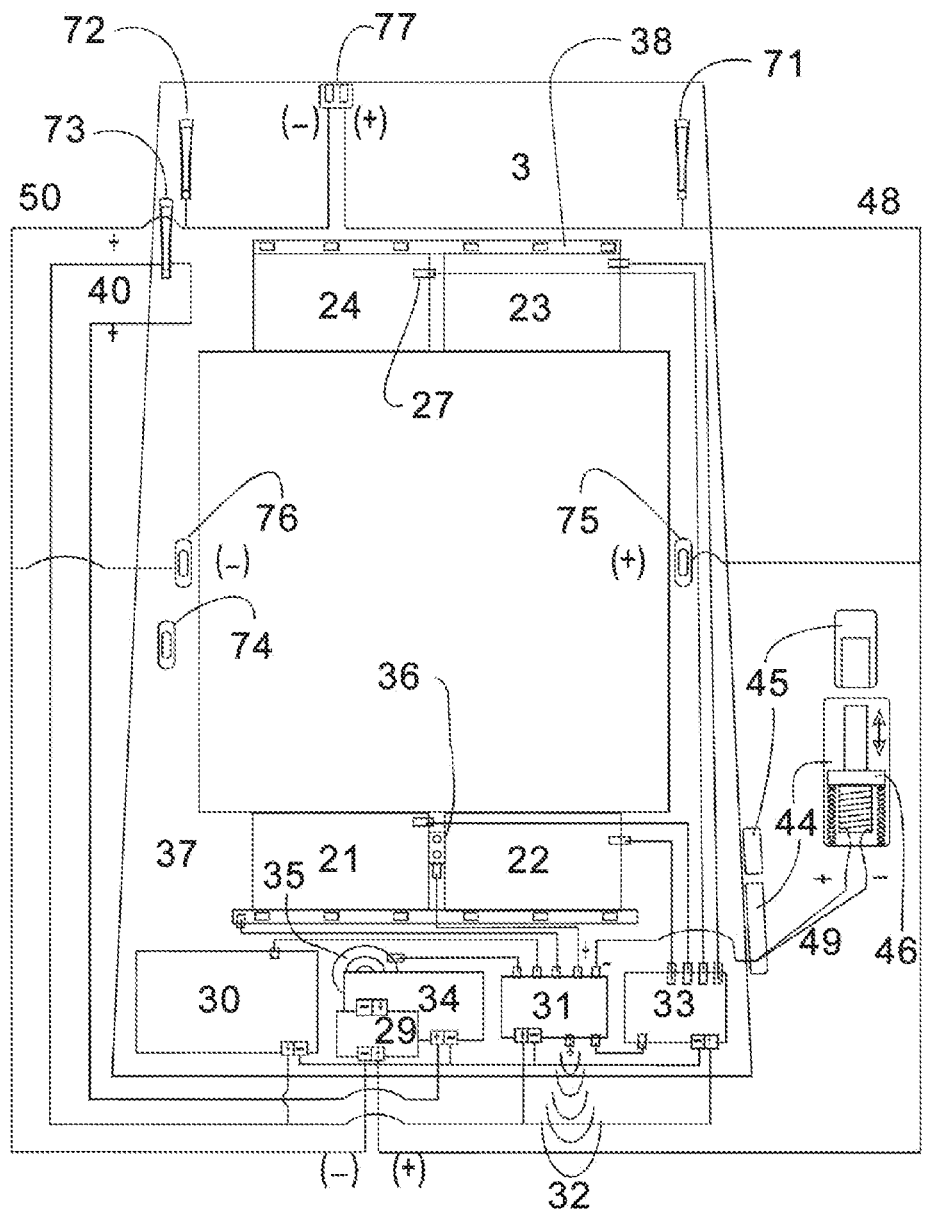
FIG. 6 shows a plan view of the lower portion of the previous figure, where the cabling between the integrated electronic components is seen; the cable that comes out of the device with RFID window towards the circuit of the solenoid that slides a closing bolt; and the groove-tab mechanisms for interconnecting the devices with RFID windows of stacked carts.

In FIG. 6 a layout drawing is shown of the lower portion of the frame 3 with a possible solution to the cabling of the components not visible to the user: the four inclined UHF antennas 21, 22, 23 and 24; metallic tabs 75 and 76 that connect the positive and negative cables of the battery 34 to the terminals of the same pole thereof in the groove connected to a positive pole 71 and in the groove connected to a negative pole 72 of the device with RFID window 1 of another stacked cart 2; the separator part 74 that is introduced into the guide 73 of another stacked cart for the electrical deactivation of the device with RFID window 1; the electrical connector 77 to an external power source 90 for charging the batteries 34 of a stack of carts 2, the linear emitter/receiver 37 and the linear reflector 38 made up of retroreflectors of the light curtain 39 (the linear reflector 38 is located on the side opposite to the linear emitter/receiver 37); on the inside of the housing 7 of the frame 3 are housed: the RFID reader 33 with anti-collision capacity and configuration, meaning that it has the capacity to emit and receive electromagnetic radiation in a sequential manner in each UHF antenna, not concurrent in time, in order to prevent the interference or collision of waves between the antennas; the processor 31 (preferably a microcomputer with new Arduino, Raspberry, etc. processors) and the rechargeable battery 34 that powers the system, together with the Protection Circuit Module (PCM) 29 that protects the battery 34 in the recharging process thereof upon connecting it to an external power source 90. Preferably, the charging of the batteries is done at night for the safety of the user.

The electrical deactivation of the device with RFID window 1 of a first cart 2 of a row of stacked carts is produced upon introducing the cart up to the end of the structure that supports the row (required by the coin mechanism in order to take out the coin of the user) such that a tab of the structure would carry out the role of the separator part 74 and would be introduced into the guide 73 of the first cart, opening the power supply circuit.

A coaxial cable that ends in the RFID reader 33 port comes out of each SMA connector 27 (SubMiniature version A, 'threaded connector for coaxial cable') of the antennas 21, 22, 23 and 24. A cable with three wires (VDC—Volts of Direct Current, ground and signal) that ends in the appropriate pins of the processor 31 comes out of the infrared sensor 36. A cable with three wires (VDC, ground and signal) that ends in the appropriate pins for the processor 31 comes out of the linear emitter/receiver 37 of the light curtain 39. A cable with 19 wires that connects with the HDMI port of the processor 31 comes out of the type-A HDMI connector (High-Definition Multimedia Interface) of the LCD screen of 7" 30. A cable of two shielded wires that connect to the audio port of the processor 31 comes out of the speaker 35. Wireless communication is carried out through a Wi-Fi adapter (Wireless Fidelity, a standard for wireless networks) 32 connected to a USB port (Universal Serial Bus) of the processor 31. The powering of the devices is carried out with the 3.7v lithium polymer battery 34 (LiPo) that is connected to the Protection Circuit Module (PCM) 29. The positive electrical cable 40 and the negative electrical cable come out of the battery 34, and connect in parallel to all the components that require direct power: LCD screen 30, processor 31 and RFID reader 33.

The positive electrical cable 40 of the battery 34 that supplies power to the components first passes through the conducting metallic part 79 between terminals housed in the guide 73 that opens or closes the electrical circuit according to whether the cart is stacked and locked, or is free and in use with all the systems receiving power from the battery 34. The mechanism operates as shown in FIGS. 17A-17C and FIGS. 18A-18E.

The processor 31 is connected to all the devices and sensors that the frame 3 incorporates, for the execution of a software that stores or removes from an electronic file the products with RFID tag that enter or exit the basket of the cart 2 through the window 6 of the frame 3, prints on the screen 30 of the frame 3 diverse information of interest for the user of the cart 2; and emits through the speaker 35 of the frame 3 diverse vocalized information of interest for the user 2. A cable with two wires 49 that activate the solenoid 46 of the catch 45 comes out of the processor 31.

The positive cable 48 and the negative cable 50 for recharging the battery 34 come out of the battery 34. The positive cable 48 connects to the metallic tab connected to a positive pole 75, with the groove connected to a positive pole 71, and with the positive pole of the plug 77. The negative cable 50 connects with the metallic tab connected to a negative pole 76, with the groove connected to a negative pole 72, and with the negative pole of the plug 77. The mechanism operates as seen in FIGS. 17A-17C and FIGS. 20A-20D.

Figure 7:
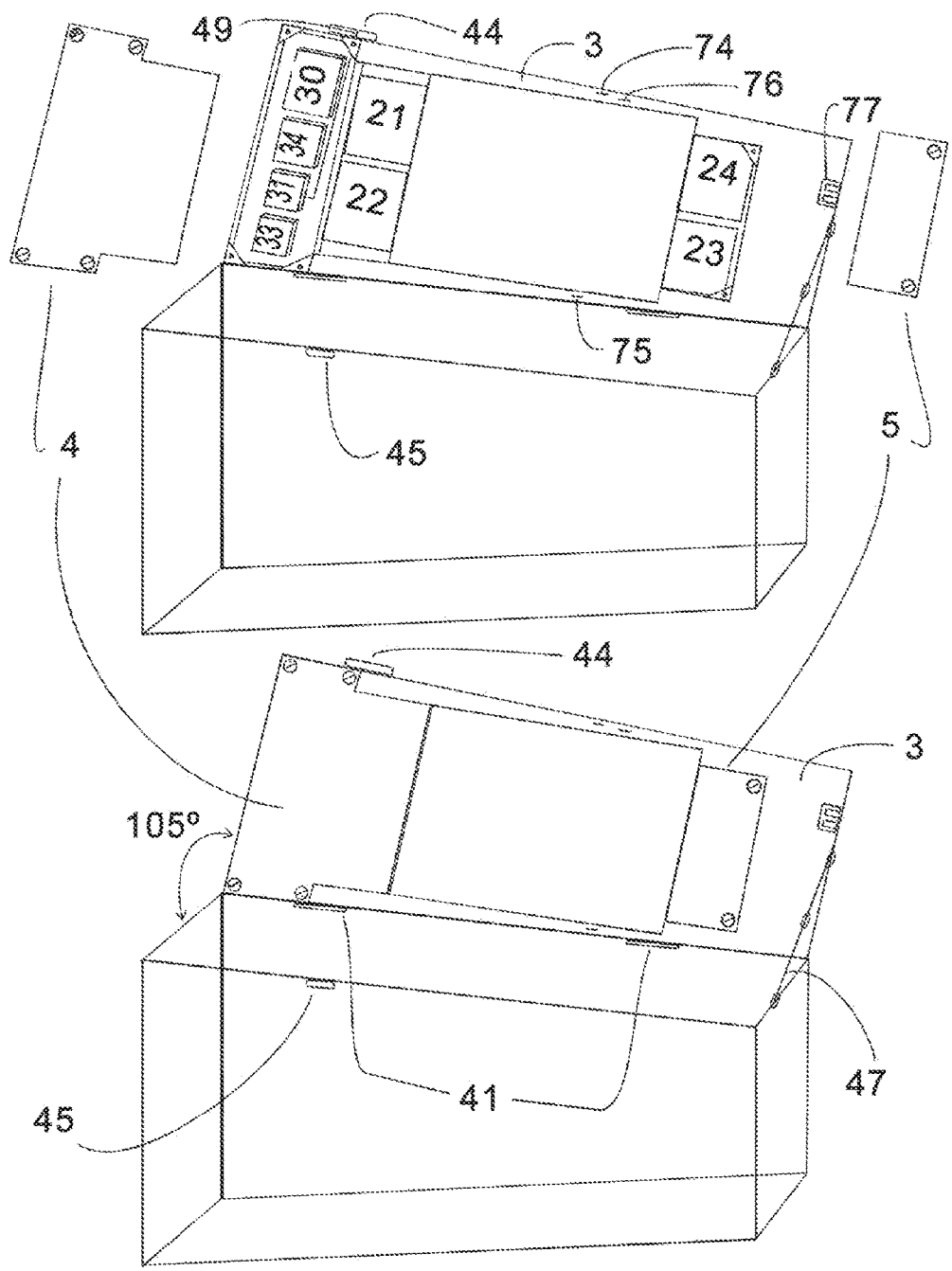
FIG. 7 shows 3D side views of the device with RFID window coupled as a roof to a conventional cart in the open roof position, showing the lower portion of the device with RFID window with the two component access covers.

In FIG. 7, the covers 4 and 5 that cover the components of the lower portion of the frame 3 can be seen.

The opening of the frame 3 can only be carried out if the bolt 42 is not introduced into the catch 45, which occurs in the extraction area of the products of the cart once the payment of the purchase has been made.

Figure 8A:
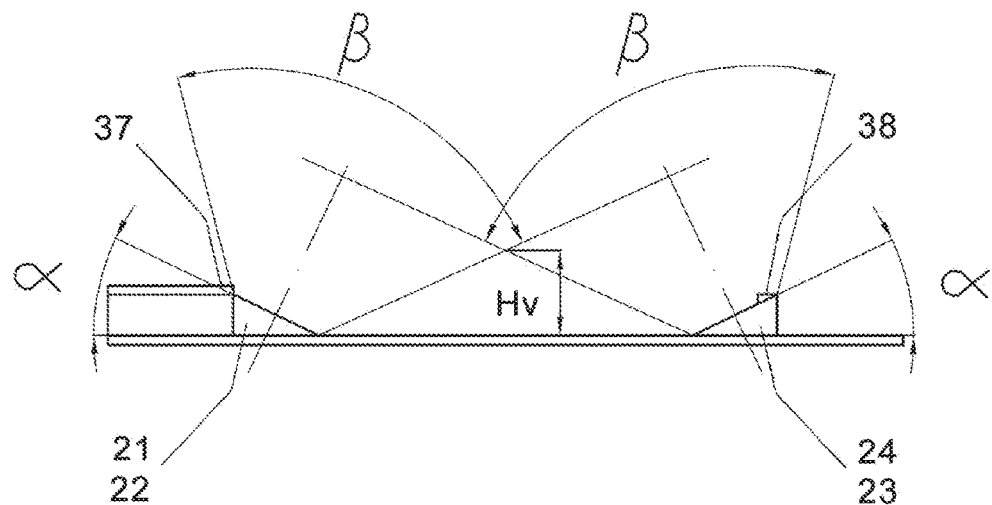
FIGS. 8A and 8B show a 3D side view of the inclination of the UHF antennas in the frame, with the geometry of the beam of maximum-density radiation power of the antennas in the vertical plane thereof.
Figure 8B:
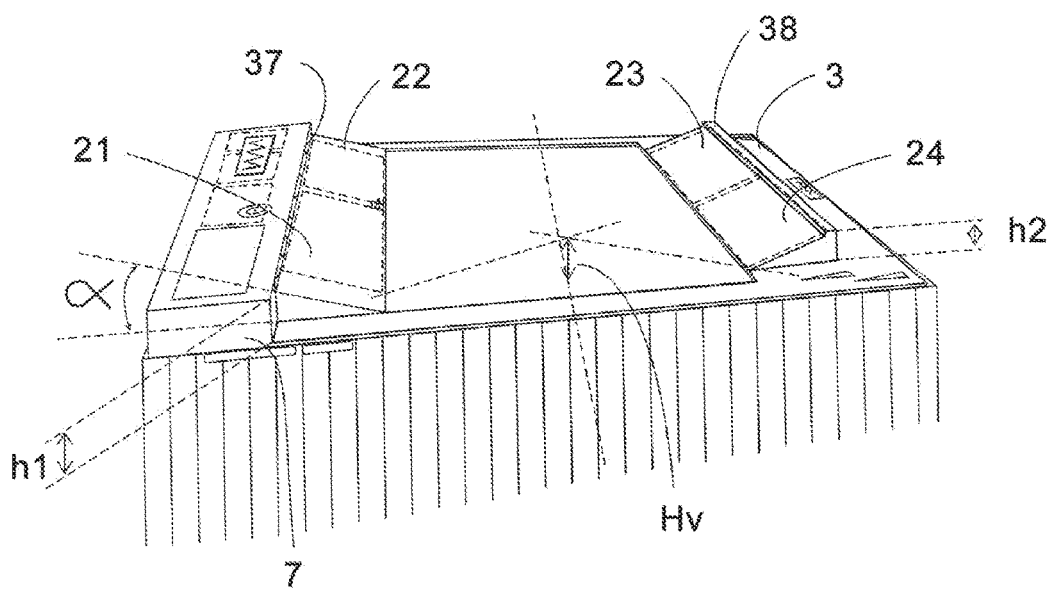

FIGS. 8A and 8B describe, in a preferred embodiment, the inclination of the UHF antennas 21, 22, 23 and 24 on the frame 3, and the height Hv that results from said inclination, projecting the beam widths from the vertical plane of the antennas until they converge on the perpendicular bisector of the window 6. The antennas used in this exemplary embodiment are from the manufacturer FlexiRay 556° XSF-110x with a frequency range of 866-868 MHz (ETSI standard) or 902-928 MHz (FCC standard), a gain of 3 dB and an impedance of 50 Ohms, with rectangular dimensions of 155×100 mm and 3 mm of thickness, and a beam width of $\beta=80°$, the angle of which limits with the decrease of radiation power in 3 dB, both in the horizontal plane and in the vertical. As shown in the drawing, the calculation of two of these opposite antennas 21, 24 with an inclination angle $\alpha=26$ on the supporting plane and separated at a distance of 400 mm makes the lower limit of the vertical radiation beam width thereof converge at a height Hv=91 mm on the perpendicular bisector of the window 6. It is the same for the case of the pair of antennas 22, 23. Said inclination produces an elevation of the frame 3 to a height h2=43 mm in which the front antennas 23, 24 and the linear reflector 38 are housed on one side of the window 6, and the rear antennas 21, 22, and the linear emitter/receiver 37 of the light curtain 39 on the opposite side. In this preferred embodiment, the electromagnetic radiation power decreases by 50% (3 dB) to a height of Hv=91 mm on the perpendicular bisector of the window 6. This height above the plane of the window 6 starts to decrease in favor of the vertical radiation power of one of the beams of an antenna as we approach any of them from the perpendicular bisector. Optionally, the antennas could be located with one on each side of the framework of the window 6.

This embodiment with chosen antennas with beam widths of $\beta=80°$ has been considered preferred, since with $\beta=80°$ the UHF antennas 21, 22, 23, 24 enable making an RFID radiation density over the volume of space that is above the window 6 with good reading of the products with RFID tags that pass through it, which enables construction of the frame 3 with an inclination of the antennas of $\alpha=26°$ without stacking problems between carts 2 (a larger angle would hinder the stacking). For example, in the case of choosing an antenna with a beam width of 110° in the vertical plane, it would enable having an angle α less than 26° which would restrict the stacking. Nevertheless, UHF radiation antennas 21, 22, 23, 24 with respect to the vertical plane thereof and to the horizontal plane can be chosen, B thereof being able to take any value comprised between 80° and 150° or more, not necessarily needing to be equal in both planes, and a being between 0° and 26°, or more in embodiments with a window 6, the side of which separates the rear antennas 21, 22 from the front ones 23, 24 being greater than 400 mm.

Figure 9A:
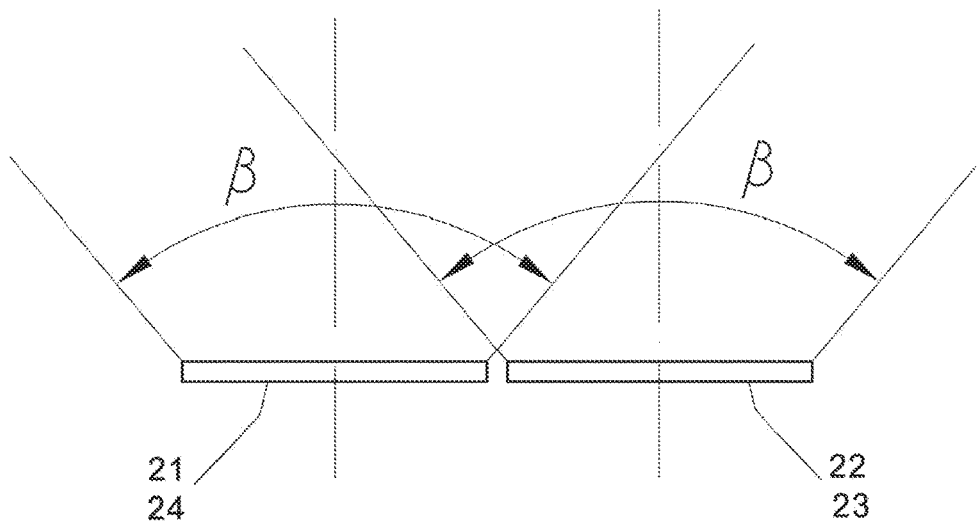
FIGS. 9A-9C show a 3D side view of the inclination of the UHF antennas in the frame, with the geometry of the beam of maximum-density radiation power of the antennas in the horizontal plane thereof.
Figure 9B:
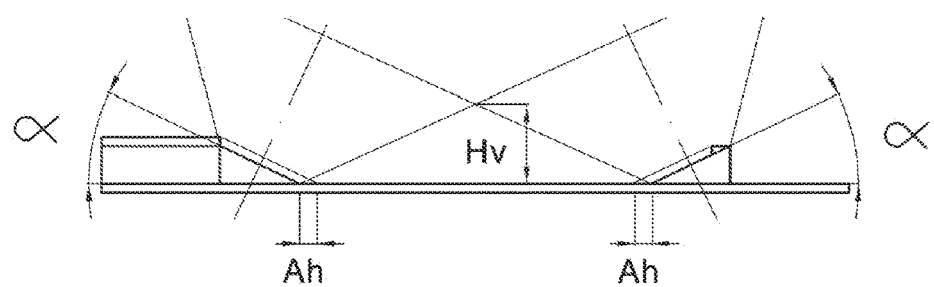
Figure 9C:
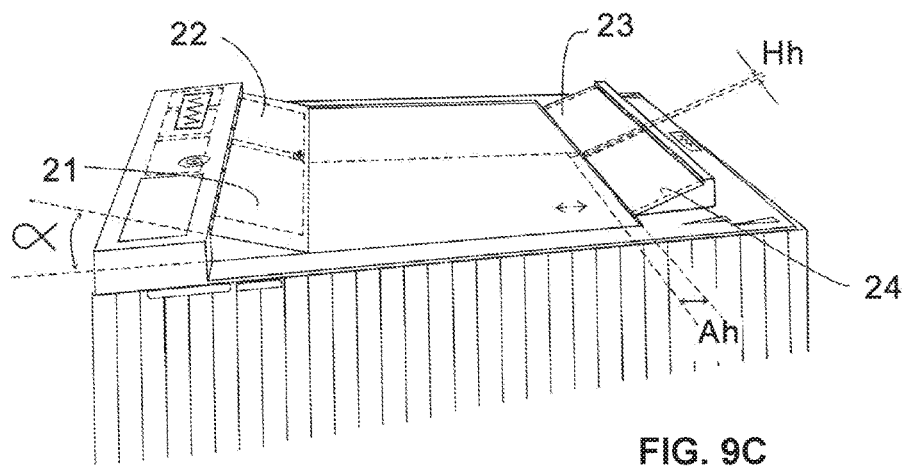

In FIGS. 9A-9C, a preferred embodiment is described that gives as a result a height Hh for the convergence of the limits of the optimal two beam widths of horizontal radiation from two rectangular antennas of 155×100 mm 21, 22 with the same characteristics indicated in FIGS. 8A and 8B, in the same plane, aligned by the smaller side thereof and separated at a distance of 10 mm. The geometric calculation determines a height Hh=6 mm. With the indicated antennas and the geometry of the position and inclination thereof in the window 6, in this preferred embodiment, the electromagnetic radiation power decreases by 50% (3 dB) to a height of Hh=6 mm above the separation line between the two antennas. That height, parallel to the inclination plane of the antennas, decreases in favor of the horizontal radiation power of one of the beams of an antenna as we approach it. The projection of the two optimal beam widths of horizontal radiation of the antennas 21, 22 or 23, 24 with an inclination angle of $\alpha=26°$ converge in the plane of the window 6 at a distance of Ah=14 mm over the perpendicular bisector of the window 6. That distance decreases in favor of the horizontal radiation power of one of the beams of an antenna as we approach any of them from the middle separation line.

In FIGS. 10A-11C, the far-field and near-field radiation diagrams are described, respectively, for the vertical V and horizontal H planes of the antennas 21, 22, 23, 24 with the same characteristics indicated in FIGS. 8A-9C.

The window 6, preferably square and approximately 400×400 mm, is optimized so that the products pass at a distance around half the wavelength of the UHF spectrum (900 MHz, 33 cm), and RFID tags are used, the UHF antenna element of which used in the tag can be in some embodiments a double resonant antenna that has sensibility for operating both in the far field frequency band of 860-960 MHz and in other lower ones of the near field. One and another one are specifically and independently coupled to one and another field, depending on the distance, resulting in an electromagnetic coupling between the specific antenna of the RDIF tag and the antenna of the RFID reader 33 in the far field, and concurrently, an inductive coupling (exclusively of magnetic field) between the other specific circuit of the RDIF tag and the antenna of the RFID reader 33 at near field distances under 20 cm (a little more than half the wavelength used), which is the maximum distance at which a product with an RDIF tag would be placed at least one of the antennas 21, 22, 23, 24 upon passing through the window 6 with dimensions of 400×400 in this exemplary embodiment. It is to be noted that in the case of using radiation with greater frequency (2.4 GHz or even more with SHF), the dimensions of the window can be optimized at a size larger than 400 mm, enabling it to not be a square window.

Figure 10A:
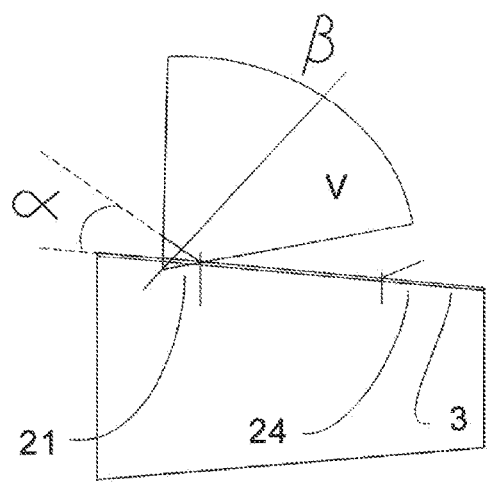
FIGS. 10A-10C show a far-field radiation diagram of the vertical and horizontal planes with antennas of 155×100 mm, beam width of $\beta=80°$ in both planes, an antenna inclination of $\alpha=26°$ and a window of 400×400 mm.
Figure 10B:
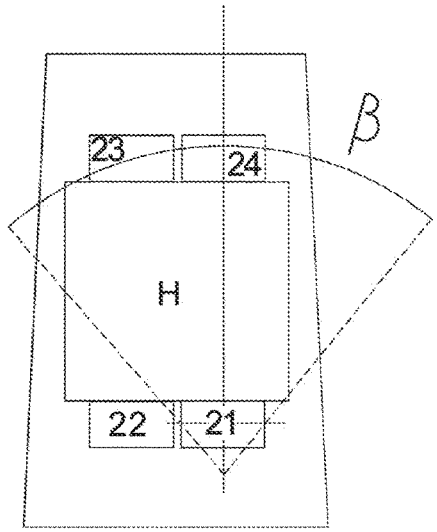
Figure 10C:
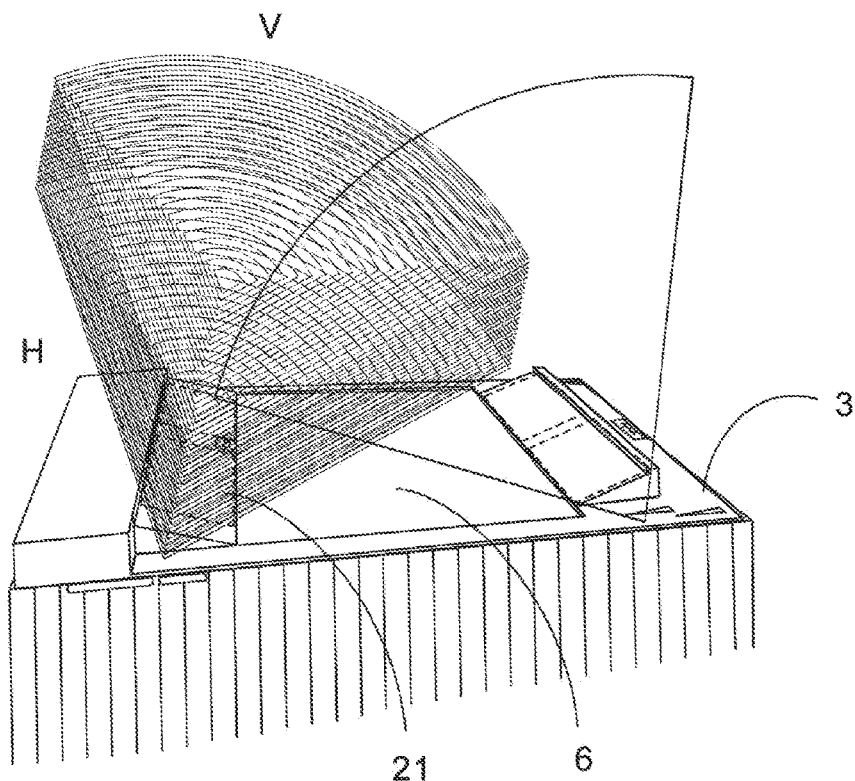

In FIG. 10A, a side view of a cart 2 with the device with RFID window 1 is described, showing the radiation diagram in the vertical plane V of the rear UHF antenna 21, with the beam width thereof of β=80° directed upwards with an inclination angle of α=26° with respect to the plane of the frame 3. In FIG. 10B, a diagram of the radiation in the horizontal plane H of the rear UHF antenna 21 with the beam width thereof of β=80° directed towards the window 6 is shown in a plan view. In FIG. 10C, a 3D drawing is shown of a tridimensional approximation of the lobe of maximum power of the rear UHF antenna 21, overlapping the radiation beams, with an angle of β=80°, of the horizontal H and vertical V planes, occupying a volume of space over the window 6. The rest of the antennas 22, 23, 24 have a similar radiation pattern from each of the positions thereof on the window 6.

In FIG. 11A, a diagram is shown of the spirals of the magnetic field (near field) of the rear UHF antenna 22, limiting the effective reach thereof within the window 6 to around 20 cm, a limit agreed upon in the scientific community for a frequency of 900 MHz, beyond which the sensibility of the RFID tag is fundamentally due to the electromagnetic coupling of the far field. In FIG. 11B, a side view of a cart 2 with the device with RFID window 1 is described, showing the diagram of magnetic field spirals generated by the rear UHF antenna 22, directed upwards with an inclination angle of α=26° with respect to the plane of the frame 3. In FIG. 11C, a plan drawing of the frame 3 is shown, with an apparent overlap, not concurrent at the same moment, of the near magnetic field diagrams of the four UHF antennas 21, 22, 23, 24.

In FIG. 12, according to a preferred embodiment shows an enlargement of the casing 44 which encloses a solenoid 46, the coil of which, magnetized with the power supply, retracts a bolt 42 freeing the catch 45 for the opening of the device with RFID window 1 of the cart (a); on the other hand, with the circuit open, the bolt 42 slides into the catch 45, propelled by the internal springs of the casing 44, impeding the normal opening of the device with RFID window 1 of the cart 2. The casing 44 is part of the shell of the frame 3. The catch 45 is joined to the chassis of the cart 2.

Figure 13:
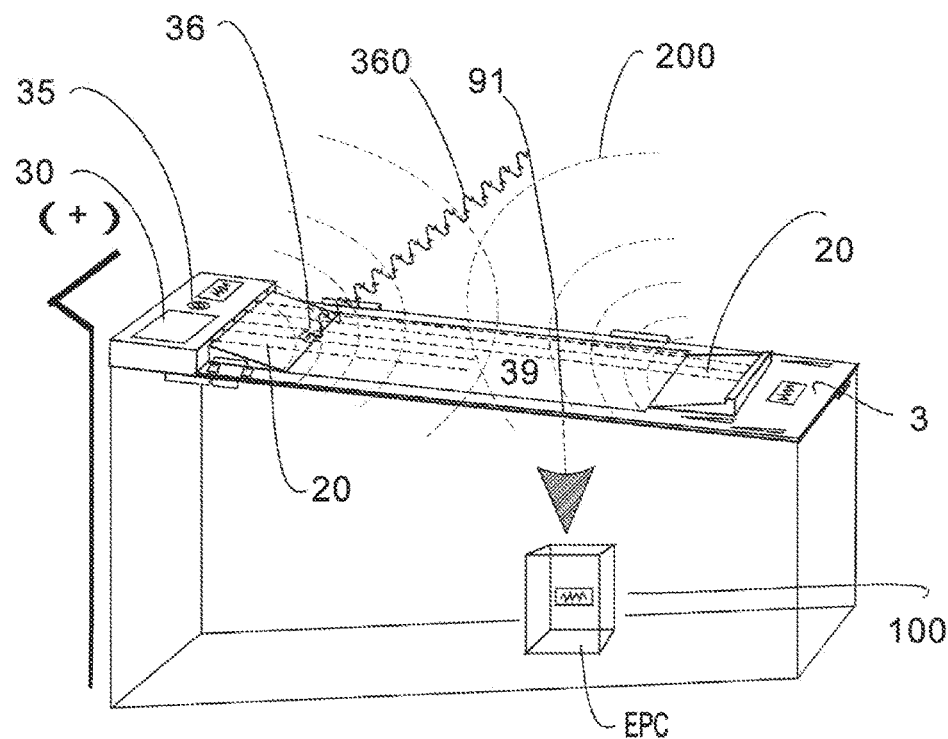
FIG. 13 shows the detection process of a product introduced in a cart with a device with RFID window.
Figure 13:
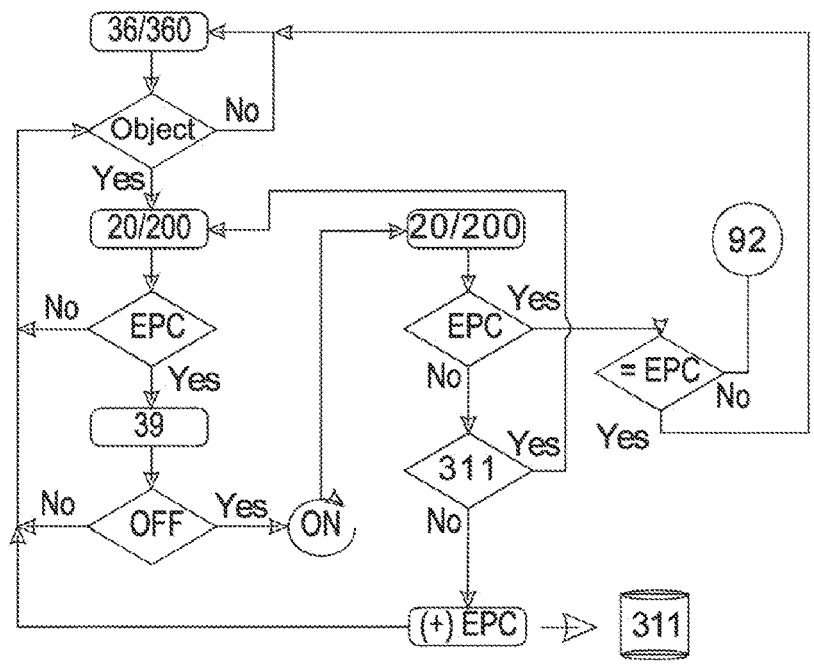

In FIG. 13, according to a preferred embodiment, the automatic activity of the sensors controlled by the processor 31 of the device with RFID window 1 can be seen, the process of which automatically resolves the generation of a computerized transaction of product entry with RFID tag in the basket of the cart 2. The heuristic process, through which the electronic transaction of product entry in a file 311 of the processor 31 is determined, is performed by specific software that non-linearly and recurrently listens to the events of the sensors through the input ports, the changes in state thereof, the duration of time thereof and the unique identification data that the RFID tags carry recorded of the products with EPC code. A flow diagram in the figure shows a simplification of the main method for controlling the sensorial events that can finally determine an automatic transaction of product entry 91 into the basket of the cart 2. A sequence of the occurrences that enable the present invention, with the original arrangement of the sensors is, without being limiting or exclusive in the steps thereof, that which is described in the flow diagram of the figure that is commented herein in a simplified manner: a user takes a product 100 from a store shelf with an RFID tag, the chip of which stores an EPC code of unique product identification. Upon moving the product through the air with their hand to introduce it into cart 2 through the window 6, the infrared sensor 36 converts the reflected light 360 of the product and the hand into an electrical current that, finally, is translated into the sending of a signal that warns the processor 31 of a nearby object. This active signal activates the UHF antennas 21, 22, 23, 24 that are inside the frame 3. The RFID tag (first EPC code) is instantaneously read before or while the hand of the user crosses the window 6 with the product 100 (the method is also used if one or several products are introduced at the same time, since the antennas can read one or several RFID tags at once), at which moment the light curtain 39 is interrupted indicating an object has passed through it. While the hand of the user remains inside the basket of the cart 2, the interrupted light curtain 39 and the infrared sensor 36 will conjointly and supplementarily maintain the electromagnetic radiation 200 of the UHF antennas 21, 22, 23, 24, waiting to know if, after the user removes their hand, the RFID tag (second EPC code) will be read again or not (the method is also used if one or several products are removed at the same time, since the antennas can read one or several RFID tags at once). In the case that no RFID tag is read upon restoring the light curtain 39, the system determines a product entry in the cart 2, storing in a file 311 of the processor 31 a new line of product introduced. On the other hand, if an RFID tag is read again upon restoring the light curtain 39, the process checks if the EPC code of the new tag read corresponds or not with the EPC code of the product that in this cycle of occurrences was previously introduced. If it is the same ("=EPC", in the flow chart), the system suspends the entry process and continues the cycle in a previous phase. In contrast, if the EPC code that is now read is different from the EPC code of the product that was previously introduced, and coincides with a previously registered product, the system determines an action for product entry 91 and concurrently, in the same cycle, an action for product exit 92, the simplified method of which can be seen in the following FIG. 14. In the activity time bar graph, it can be seen that the infrared sensor 36 is permanently active waiting for changes in lighting 360 in the action radius thereof, and that the RFID radiation 200 of the UHF antennas 21, 22, 23, 24 is only activated during the time that the detection of nearby objects lasts and, supplementarily, while the light curtain 39 is interrupted by an object that passes through it. Moreover, the light curtain 39 is permanently active, signaling any passage through it.

Figure 14:
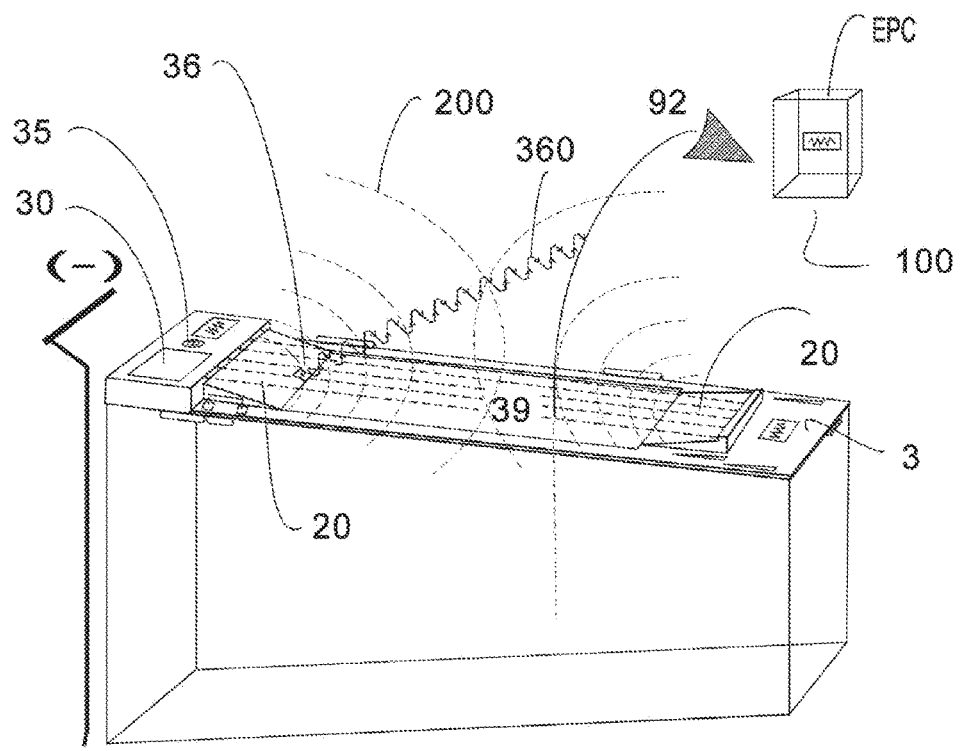
FIG. 14 shows the detection process of a product removed from a cart with a device with RFID window.
Figure 14:
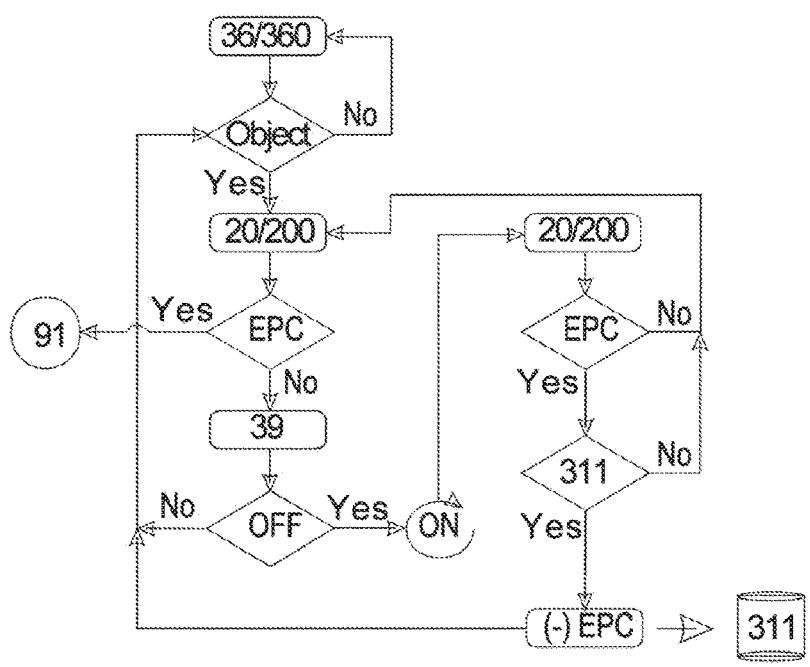

In FIG. 14, according to a preferred embodiment, the automatic activity of the sensors controlled by the processor 31 can be seen, the process of which automatically resolves the generation of a computerized interaction of product exit with RFID tag from the basket of the cart 2.

In this case, the flow chart in the figure shows a simplification of the main method for controlling the sensorial events that can finally determine an automatic transaction of product exit 92 from the basket of the cart 2. The user introduces their hand, in this case, without any product (the case of an extraction that is concurrent and subsequent to a product entry in the same cycle has already been described in FIG. 13). Upon moving their hand above the window 6, the infrared sensor 36 converts the reflected light 360 of the product and the hand into an electrical current that, finally, is translated into the sending of a signal that warns the processor 31 of a nearby object. This signal activates the UHF antennas 21, 22, 23, 24 inside the frame 3. In this case, the UHF antennas 21, 22, 23, 24 will not detect any RFID tag (a first EPC code is not detected). Then, the hand of the user passes through the window 6, in which moment the light curtain 39 is interrupted indicating the passage of an object through it. While the hand of the user is kept inside the basket of the cart 2, the interrupted light curtain 39 and the infrared sensor 36 will conjointly and supplementarily maintain the electromagnetic radiation 200 of the UHF antennas 21, 22, 23, 24, waiting to know if, after the user removes their hand, the RFID tag (second EPC code) will be read again or not. In the case of no RFID tag being read upon restoring the light curtain 39, the system abandons the exit process and is located in a phase previous to the cycle. On the other hand, if an RFID tag is read upon restoring the light curtain 39, the process checks if said EPC code was already found in the file 311 of transactions of previous entries into the cart 2, in which case it proceeds to the removal or extraction thereof of the product from the cart 2. If that EPC code is not found in the list of transactions of the file 311, it is taken as an unintentional hovering reading with no effect in the cart 2. In the activity time bar graph, it can be seen that the infrared sensor 36 is permanently active waiting for changes in lighting 360 in the action radius thereof, and that the RFID radiation 200 of the UHF antennas 21, 22, 23, 24 is only active during the time that the detection of nearby objects lasts and, supplementarily, while the light curtain 39 is interrupted by an object that passes through it. Moreover, the light curtain 39 is permanently active, signaling any passage through it.

Figure 16A:
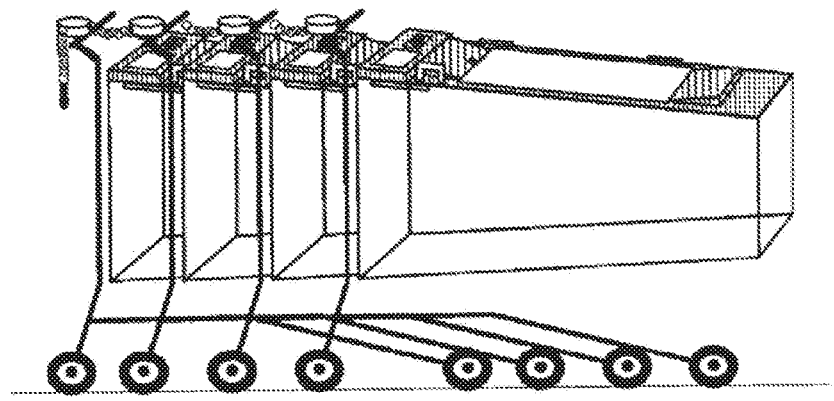
FIGS. 16A-16C show a cart with double side opening so that the carts with a device with RFID window can be stacked. The side panels and triangular upper panel are seen.
Figure 16B:
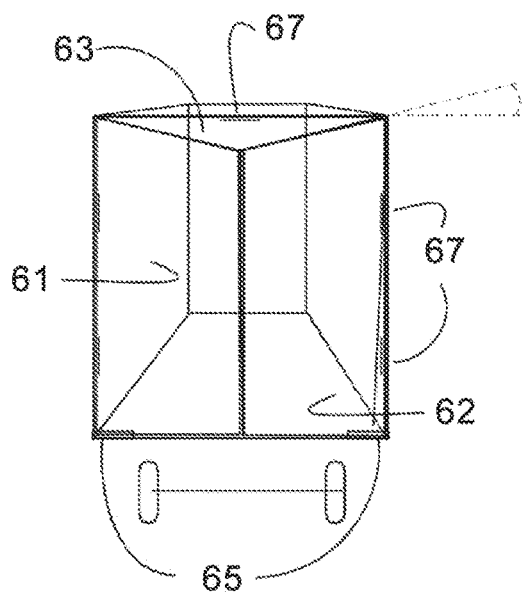
Figure 16C:
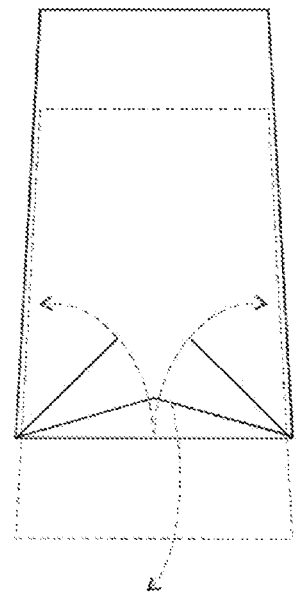

As is known, the conventional carts are configured so that as a cart 2 is stacked on another, the rear wall of the cart is lifted upwards, rotating on a shaft, close to the handle of the cart 2, and that, therefore, once rotated it surpasses the opening of the cart 2. Nevertheless, this solution cannot be used in a cart 2 that incorporates the device with RFID window 1 as a roof, since the device with RFID window 1 impedes the rear wall from rotating completely so that another cart 2 can fit, impeding the stacking of the carts 2. Thus, according to a preferred embodiment, the rear wall comprises three panels 61, 62, 63. The side panels 61, 62 that are opened on the side, are rectangular trapezoids, with two right angles, a 70° angle and another 110° angle. The upper triangular panel 63, which is opened vertically, is an isosceles triangle with two 20° angles. In this way, when the panels 61, 62, 63 are closed, the basket of the cart 2 has no openings. The hinges 67 and the stops 65 enable collapsing the panels 61, 62, 63. With this construction, the carts 2 with a device with RFID window 1 can be collapsed as seen in FIGS. 16A-16C. Nevertheless, another particular embodiment envisages only side panels.

Figure 15:
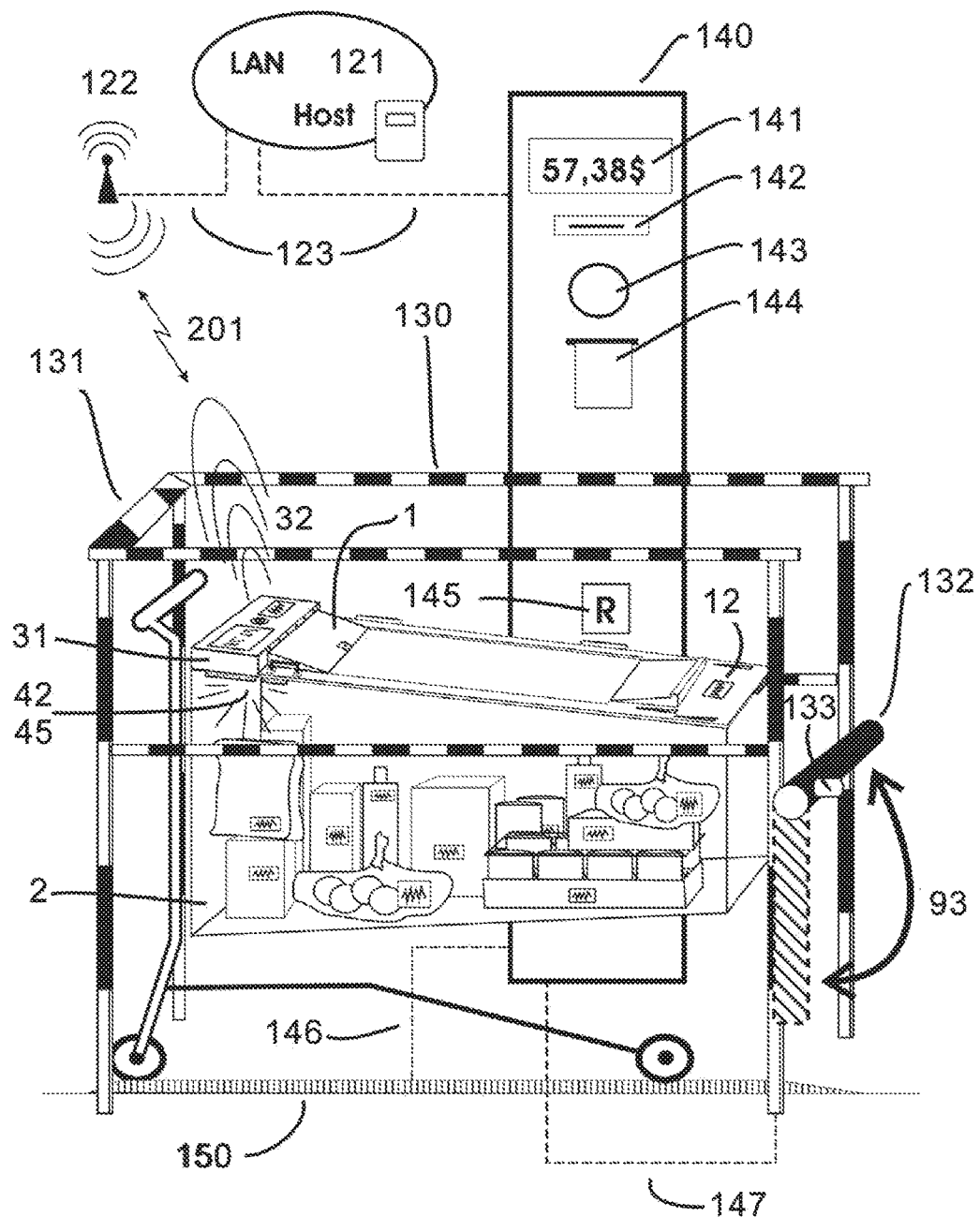
FIG. 15 shows the automation of the payment of the products of a shopping cart with a device with RFID window, with electronic means (bank card, mobile phone or other) through a payment station, with control scale in the floor, according to the present invention.

FIG. 15 shows, according to a preferred embodiment, a general and simplified description of the sequence of occurrences that take place in order to automatically resolve and control the payment of the products introduced into a cart 2 with RFID window 1, without the intervention of an assistant or cashier of the store and without the need to scan each product of the cart. The user, once they have finished shopping in the store, brings their cart to a payment station 140 in the vicinity of the cashiers. The payment station 140 houses a plurality of devices that are connected to a computer on the inside thereof (not drawn): an LCD screen 141; a card reader for the introduction of an electronic bank card 142 or another means of electronic payment, an illuminating stoplight 143; a receipt printer 144; and an RFID tag reader 145. In turn, the computer is connected to two devices outside the station: a floor scale 150 with a data cable 146, and with another cable 147 to a rotation motor 133 for collapsing or raising 93 a bar 132 of the bar structure 130.

The sequence is as follows. The user introduces the cart through an aisle created by the guides of a bar structure 130, up to the stop of the collapsible bar 132. The bar 131 impedes the user from being able to pass through the aisle and step on the floor scale 150. The floor scale 150 sends the weight of the cart, with all the products inside of it, to the computer of the station and it turns on the YELLOW stoplight 143. The RFID reader 145 of the station detects the cart number through the passive RFID reader 12. The computer of the station starts a payment session with the central server or the Local Network HOST 121 by sending the following data: station number, cart number and weight, through the Ethernet communication cable 123. The payment session continues in the HOST by establishing a wireless communication 201 with the Wi-Fi adapter 32 of the device with RFID window 1, through the Access Point 122, after which the processor (or a minicomputer) 31 of the device with RFID window 1 sends the electronic list of articles recorded in the file thereof to the HOST. The HOST calculates the theoretical weight of the electronic list of said products according to the master table of articles from a database, and adds the tare weight of that cart according to the master table of carts from a database. If the weight sent by the floor scale deviates by more or less than a determined amount with the calculated theoretical weight, the HOST sends an "payment invalid" signal to the computer of the station 140, which lights up the RED stoplight 143, and prints an incident message on the screen 141: "NOT VALID: WAIT FOR AN ASSISTANT". The HOST sends an alarm to the cashier service for assistance at that station, and concludes the payment session. If, on the other hand, the calculated and scale weights are within the allowed margin, the HOST calculates the total amount of the purchase with the electronic list of the articles and sends that amount to the computer of the station which prints it on the screen 141, for example "$57.38". The user introduces their bank card in the slot 142 or another means of payment (contactless smartphone, etc.), the HOST establishing a conventional payment protocol. Once the payment has been successfully made, the HOST sends the "payment made" signal along with the file of the purchase receipt to the computer of the station 140, which produces the following events in the station: the stoplight 143 turns GREEN, the purchase receipt is printed by the printer 144, the screen 141 prints the message: "PAYMENT MADE", and the bar 132 collapses 93 with the rotation motor 133 which enables removing the cart from the aisle 130. At the same time, the HOST sends, through wireless communication 201 to the processor (minicomputer) 31, the order to free the bolt 42 of the catch 45 so that the user, once the cart is in the exit area, can collapse the device with RFID window 1 of the cart (as described in FIG. 12), enabling more comfortable unloading of the products. Once the cart leaves the floor scale and returns to ZERO Kilos, the bar 132 rises again 93 with the rotation motor 133, the stoplight 143 turns off, the screen 141 prints the message: "WAITING FOR NEW CART", and the payment session with the HOST is completed.

Figures 17A, 17B, 17C:
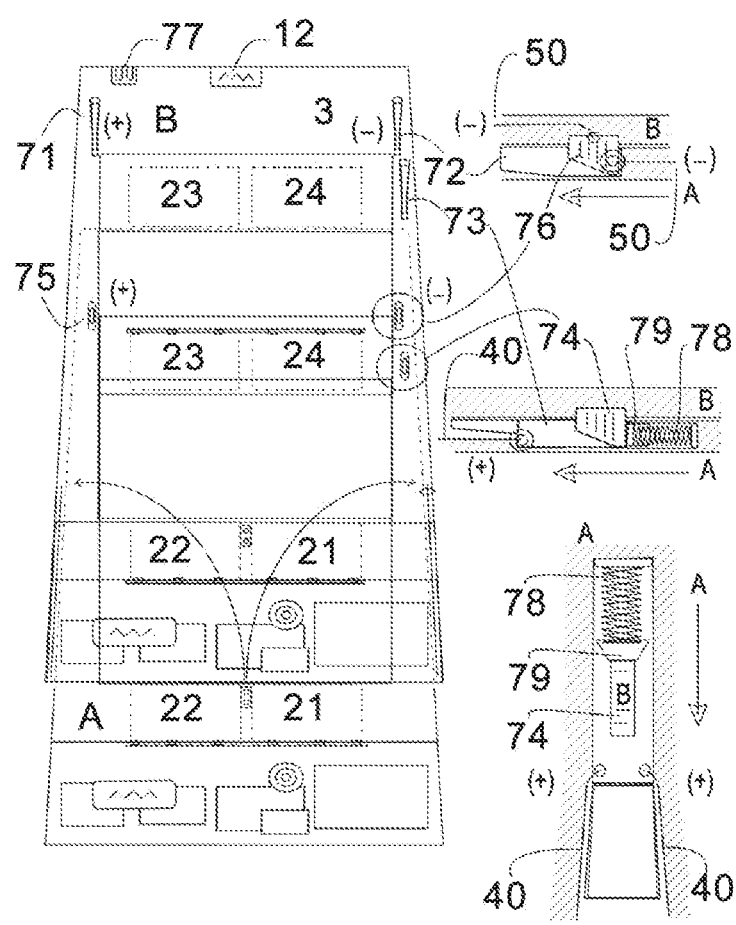
FIGS. 17A-17C show a plan view of two stacked carts with figures of details of the electrical interconnection that the positive and negative cables of both frames establish for the charging of the batteries thereof in parallel with an external power source, and the electrical activation mechanism of the components of the device with RFID window upon freeing it from the locking thereof in a stack of carts.

In FIGS. 17A-17C, according to a preferred embodiment, a general description of the groove-tab connection systems between the two frames 3 of two stacked carts A and B is shown. The groove-tab connection is useful for electrically connecting two frames 3 or for converting a mechanical stacking signal into an electrical signal. The frames 3 are interconnected electrically, upon being stacked, putting the metallic tab connected to a positive pole 75 and the metallic tab connected to a negative pole 76, which protrude from the lower portion of a first already stacked cart 2, in contact with the groove connected to a positive pole 71 and the groove respectively connected to a negative pole 72 of a second cart 2 that is stacked on the first one.

In FIG. 17A, the contact is shown between the metallic tab connected to a negative pole 76 of the cart B, with the groove connected to a negative pole 72 of the cart A, upon embedding the cart A on the cart B, as seen in the figure. The mechanism is identical for the case of the metallic tab connected to a positive pole 75 and the groove connected to a positive pole 71.

In FIG. 17B, a side view is shown of the spring 78 of the cart A that has been compressed as the separator part 74 of the cart B opposes the advance thereof, with the stacking of the cart A on the cart B. As described in FIG. 17C, with the withdrawal of the spring 78 from the starting position thereof due to the locking of the separator part 74 of the passage thereof, the conducting metallic part 79 opens the circuit of the positive cable 40 that supplies power to the components (see FIG. 6), such that, with the stacking, the power supply from the battery 34 to the different electronic components stays interrupted, with which the device with RFID window 1 stays inactive and without consumption of battery 34.

Figure 18A:
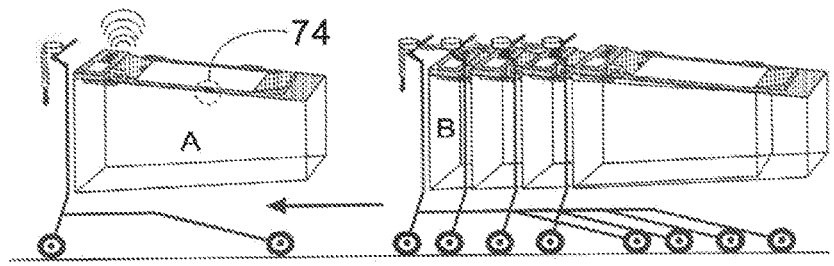
FIGS. 18A-18E show detail drawings of the electrical activation mechanism of the components of the device with RFID window upon freeing it from the locking thereof in a stack of carts. Detail of the closing of the power supply circuit with a bridge between the terminals of the positive cable of the battery, moved by a spring that returns to the initial state thereof.
Figure 18B:
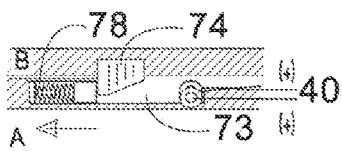
Figure 18C:
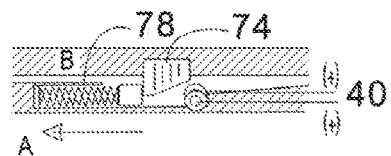
Figure 18D:
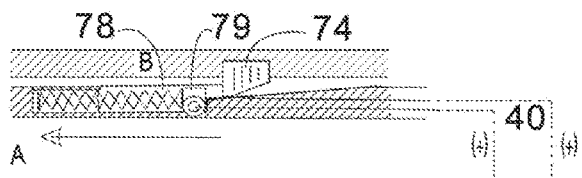
Figure 18E:
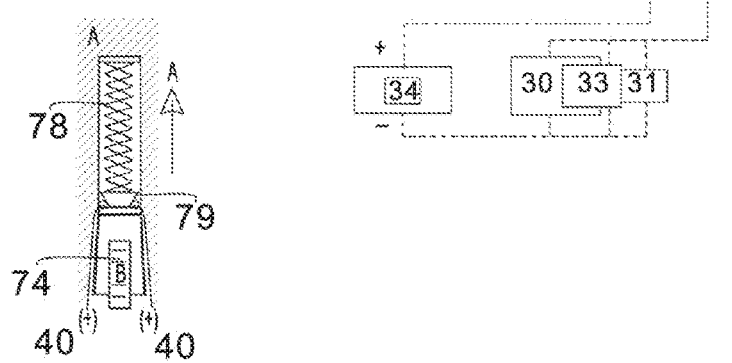

In FIGS. 18A-18E, according to a preferred embodiment, a detailed description is shown of the groove-tab mechanism that closes the power supply circuit of the components of the device with RFID window 1 with the unstacking of a cart (FIG. 18A). FIG. 18B shows a detail of the frame 3 of the cart A stacked inside another cart B. In this state, the separator part 74 of the frame 3 of the cart B keeps the spring 78 of the cart A compressed, with which the positive cable 40 that provides power to the components are not in contact, for which reason the device with RFID window 1 is inactive. FIG. 18D shows the final situation of the unstacking of the cart A on the cart B, producing the complete distension of the spring 78 with the consequent electrical contact between the positive cable 40 through the conducting metallic part 79 of the spring 78, as shown in FIG. 18E. With this contact, the circuit of the battery 34 that powers the LCD screen 30, processor 31, RFID reader 33, the infrared sensor 36 and the light curtain 39 is closed, restarting the system, ready for use. FIG. 18C is an intermediate state in the unstacking of the cart A.

Figure 19A:
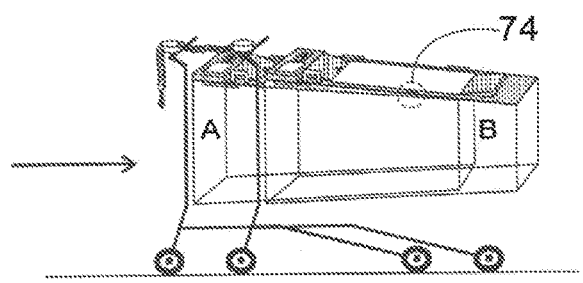
FIGS. 19A-19E show detail drawings of the electrical deactivation mechanism of the components of the device with RFID window upon locking it in a stack of carts. Detail of the open electrical circuit of the power supply, with the suppression of the conducting metallic part that connected the terminals of the positive cable of the battery, moved by the pushing force of the user upon stacking the cart.
Figure 19B:
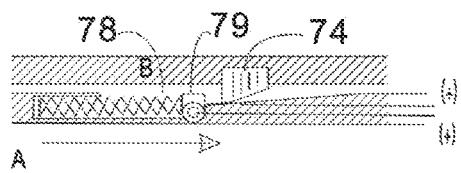
Figure 19C:
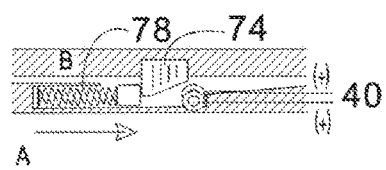
Figure 19D:
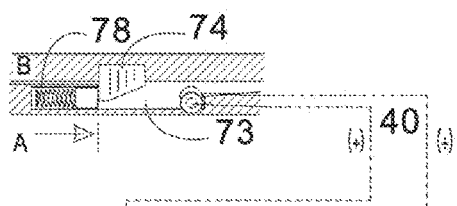
Figure 19E:
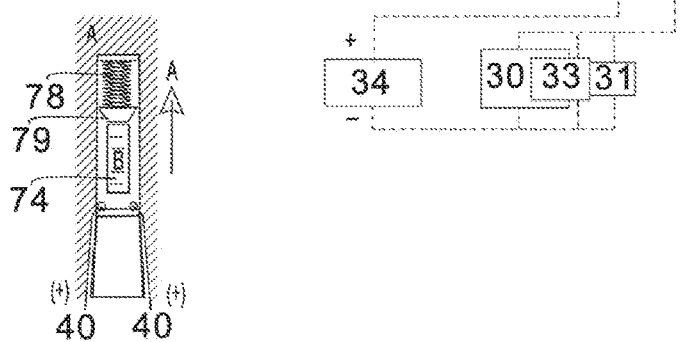

In FIGS. 19A-19E, according to a preferred embodiment, a detailed description is shown of the groove-tab mechanism that opens the power supply circuit of the components of the device with RFID window 1 with the stacking of a cart (FIG. 19A). FIG. 19B shows a detail of the frame 3 of the active cart A before being stacked inside another cart B. In this state, the separator part 74 of the frame 3 of the cart B does not compress the spring 78 of the cart A, with which the positive cable 40 that powers the components are in contact, for which reason the device with RFID window 1 is active. FIG. 19C shows the moment in which the stacking of the cart A on the cart B starts, producing the compression of the spring 78 and the positive cable 40 ceasing to establish electrical contact through the conducting metallic part 79 of the spring 78, as seen in FIG. 19E. With this loss of contact, the circuit of the battery 34 that powers the LCD screen 30, processor 31, RFID reader 33, the infrared sensor 36 and the light curtain 39 is opened, deactivating all the systems. FIG. 19C is an intermediate state in the stacking of the cart A.

In FIGS. 20A-20D, according to a preferred embodiment, a detailed description is shown of the groove-tap mechanism that, with the aim of recharging the batteries 34, interconnects the positive poles and the negative poles of the batteries 34 of the stacked carts 2. They are described as positive and negative poles in a purely explanatory manner of the present invention since, regardless of the voltage, the current supplied can be either continuous (DC) or alternating (AC). Thus, for each pole, the device with RFID window 1 has a tab in the lower portion of the frame 3 that is slid in the corresponding groove thereof of the upper portion of the frame of another cart when stacked. In FIG. 20B, the negative cable 50 of the metallic tab connected to a negative pole 76 of a cart B that establishes contact with the groove connected to a negative pole 72 of a cart A stacked on it, is shown. FIG. 20C is analogous for the positive pole, with the positive cables 48, the metallic tab connected to a positive pole 75 and the groove connected to a positive pole 71, of the carts A and B. With this interconnection, the batteries 34, which in this preferred embodiment are lithium polymer or LiPo (FIG. 20D), stay connected in parallel putting a protection circuit module (PCM) 29 in front of each battery 34 in order to charge the batteries 34. The electrical connector 77 of the first cart enables the charging of the batteries 34 of all the carts when they are stacked correctly (FIG. 20A).

It is worth noting that the present invention is not limited to a shopping cart with a single basket, but it is also equally efficient and applicable to shopping carts with more than one basket, by just coupling and adapting as many devices with RFID windows 1 as there are baskets in the shopping cart 2. It is also not limited to a shopping cart 2, but rather is equally effective in other applications wherein the device with RFID window 1 is coupled to a fixed structure instead of a mobile cart, and the container could be a basket, a box or any other receptacle, as seen in FIGS. 21A and 21B.

Figures 21A, 21B:
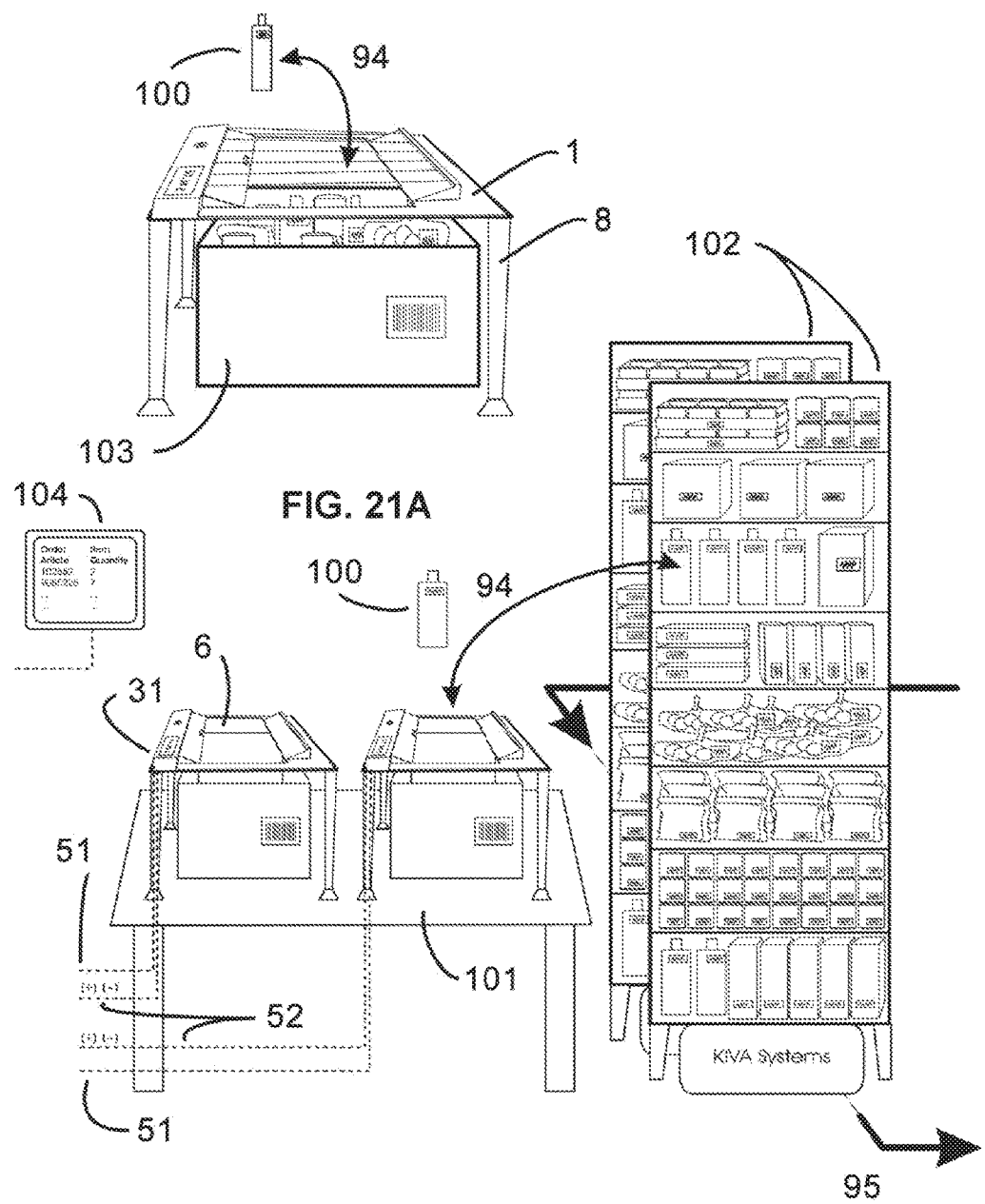
FIGS. 21A and 21B show an exemplary application of the device with RFID window, adapted to a fixed structure for the picking orders in a logistics warehouse of electronic commerce with Kiva Systems-type mobile shelves, according to the present invention.

In FIG. 21A, an alternative adaption of the device with RFID window 1 is shown on a fixed structure of pedestals 8, the container of which is a box 103, made of cardboard or another material, to which products 100 are introduced or removed 94, with the same functional nature and effectiveness as in the case of a shopping cart 2 with a device with RFID window 1, the description of which can be seen in the FIGS. 13 and 14.

In FIG. 21B, an exemplary application is shown of two devices with RFID windows 1 adapted to the fixed structure thereof 8 on a table 101, with power cables 52 and data communication cables 51 between the processor 31 and a central server or HOST of the Local Network 121, below which there are boxes 103 that act as containers for the products 100 having RFID tags that are introduced or removed 94 by passing them through the window 6 of each device with RFID window 1. It is carried out the same heuristic identification method described in FIG. 13, to determine an electronic input transaction in the container, and FIG. 14, for determining an electronic output transaction of the container, with the sensors: infrared 36, photoelectric curtain 39 and UHF antennas 21, 22, 23, 24; which recording will be performed by the processor 31 in a file 311. In this exemplary application, mobile shelves 102 are shown that are moved 95 with KIVA Systems-type robots to the table 101, making the articles with RFID tags of the order accessible to the worker of the table who starts to introduce 94 them into the box 103 corresponding to the order, with the same automation and efficiency that are described in FIGS. 13 and 14. A display of the central server 104 or HOST indicates to the operator of the table the filling of the boxes with the articles entered and the advance of each order, without having to scan any of the articles, which allows him to have both hands free to fit the articles properly.

The present invention should not be taken to be limited to the embodiment herein described. Other arrangements may be carried out by those skilled in the art based on the present description. Accordingly, the scope of the invention is defined by the following claims.

PATENT CITATIONS

| Cited patent | Filing date | Publication date | Applicant | Title |
|---|---|---|---|---|
| US20030015585 A1 | 19 Jul. 2001 | 23 Jan. 2003 | Ncr Corporation | Self checkout system utilizing networked shopping carts |
| U.S. Pat. No. 7,443,295 B2 | 1 Dec. 2005 | 28 Oct. 2008 | Media Cart Holdings, Inc. | Media enabled advertising shopping cart system |
| US2009230643A1 | 11 Sep. 2007 | 17 Sep. 2009 | Wanzl Metallwarenfabrik GmbH | Shopping cart |
| US20080149710 A1 | 6 Mar. 2008 | 26 Jun. 2008 | Silverbrook Research Pty Ltd | Shopping Cart System With Automatic Shopping Item Total Calculator |
| US20060208072 A | 10 Jun. 2005 | 21 Sep. 2006 | Industrial Technology Research Institute | Shopping cart with RFID capability |
| PCT/US2015/042438 | 28 Jul. 2015 | 4 Feb. 2016 | Wal-Mart Stores, Inc. | Apparatus and method for building a shopping list with a sensor unit |

The invention claimed is:

1. A device with a RFID (Radio Frequency Identification) window that couples to a mouth of a shopping cart, wherein the device comprises:
   a frame that comprises:
   a window horizontally crossed by a plurality of light rays coming from a light curtain,
   an infrared sensor located on a side of a framework of the window,
   an RFID reader connected to at least two UHF (Ultra High Frequency) antennas, wherein the at least two UHF antennas are located on opposite sides of the framework of the window and are inclined with an angle α over the frame, and wherein radiation beams of the at least two UHF antennas cover a space of the window, and
   a processor connected to the infrared sensor, to the light curtain, and to the RFID reader; wherein:
   the infrared sensor is configured to detect at least one object that approaches the window;
   the at least two UHF antennas are configured to be activated when the infrared sensor detects the at least one object that approaches;
   the RFID reader is configured to detect and identify EPCs (Electronic Product Code) of RFID tags incorporated in objects that enter or exit the shopping cart through the window; and
   the light curtain is configured to detect any object that passes through it, and the processor is configured to store objects that stay within the shopping cart in an electronic shopping list.

2. The device according to claim 1, wherein the frame comprises a first power supply circuit configured to electrically disconnect the device when a plurality of shopping carts are stacked, each shopping cart comprising:
   a separator part; and
   a guide that comprises a spring on an inside thereof and a conducting metallic part; wherein upon stacking the plurality of shopping carts, the separator part of a first stacked cart is configured to be introduced in the guide of a second stacked cart, thereby compressing the spring with the metallic conducting part and opening said first power supply circuit.

3. The device according to claim 2, wherein the frame comprises a second power supply circuit configured to recharge a supply battery of the device when the plurality of shopping carts are stacked, each shopping cart comprising: an electrical connector;
   a groove connected to a positive pole and a groove connected to a negative pole; and
   a metallic tab connected to a positive pole and a metallic tab connected to a negative pole;
   wherein the metallic tab connected to a positive pole and the metallic tab connected to a negative pole of the first stacked cart are configured to be respectively connected to the groove connected to a positive pole and to the groove connected to a negative pole of the second stacked cart, and in turn, the electrical connector of the first stacked cart is configured to be connected to an external power source.

4. The device according to claim 1, wherein the window has dimensions of 400×400 mm.

5. The device according to claim 1, wherein the at least two UHF antennas are placed on a horizontal plane of the frame with an inclination angle α with a value comprised between 0 and 26 degrees; and wherein the at least two UHF antennas have a radiation beam width with respect to a vertical plane and a horizontal plane of the at least two UHF antennas of β with a value between 80 and 150 degrees.

6. The device according to claim 1, wherein the light curtain is arranged such that the plurality of light rays of said light curtain cover all of a surface of the space delimited by the window.

7. The device according to claim 1, wherein the frame additionally comprises:
   an LCD (Liquid Crystal Display) screen configured to display information of the at least one object introduced into the shopping cart;
   an active RFID tag configured for identification and localization of the shopping cart in real time;
   a speaker configured to emit vocalized information of interest for a user of the shopping cart; and
   a passive RFID tag configured for identification of the shopping cart in a payment area.

8. The device according to claim 1, wherein the at least two UHF antennas are configured to be activated during detection of the at least one object by the infrared sensor and while the light curtain is interrupted.

9. The device according to claim 1, wherein the at least two UHF antennas are at least four UHF antennas arranged two by two on opposite sides of the framework of the window and arranged one on each side of the framework of the window.

10. A shopping cart comprising a device with a RFID (Radio Frequency Identification) window that couples to a mouth of the shopping cart, wherein the device comprises:
a frame that comprises:
a window horizontally crossed by a plurality of light rays coming from a light curtain,
an infrared sensor located on a side of a framework of the window,
an RFID reader connected to at least two UHF (Ultra High Frequency) antennas, wherein the at least two UHF antennas are located on opposite sides of the framework of the window and are inclined with an angle t over the frame, and wherein radiation beams of the at least two UHF antennas cover a space of the window, and
a processor connected to the infrared sensor, to the light curtain, and to the RFID reader, wherein:
the infrared sensor is configured to detect at least one object that approaches the window;
the at least two UHF antennas are configured to be activated when the infrared sensor detects the at least one object that approaches;
the RFID reader is configured to detect and identify EPCs (Electronic Product Code) of RFID tags incorporated in objects that enter or exit the shopping cart through the window; and
the light curtain is configured to detect any object that passes through it, and the processor is configured to store objects that stay within the shopping cart in an electronic shopping list.

11. The shopping cart according to claim 10, wherein the shopping cart comprises a base, a front wall, two side walls, and a rear wall, wherein the rear wall comprises two side panels configured to be opened laterally and an upper panel configured to be opened vertically to permit stacking with another shopping cart.

12. A method of identification by RFID (Radio Frequency Identification) in a device with a RFID window, the method comprising:
detecting, with an infrared sensor, at least one object that approaches the window of the device;
in response to the detection of the at least one object, activating at least two UHF (Ultra High Frequency) antennas;
detecting and identifying, with an RFID reader, a first EPC (Electronic Product Code) of each RFID tag of the at least one object, and storing said first EPC in a file of a processor; and
in response to interruption and restoration of a light curtain, attempting to detect and identify a second EPC.

13. The method of identification by RFID according to claim 12, wherein if a second EPC is not detected, then entry of the at least one object into the shopping cart corresponding to the first EPC stored is detected.

14. The method of identification by RFID according to claim 12, further comprising: in response to detecting the second EPC, determining if said second EPC is identical to the first EPC;
in the case of the first EPC and the second EPC being identical, determining an object exit, and eliminating an object corresponding to the first EPC stored from the file; and
in the case of the first EPC and the second EPC being different, determining an object entry corresponding to the first EPC, concurrently determining an object exit, and eliminating an object corresponding to the second EPC stored from the file.

15. The method of identification by RFID (Radio Frequency Identification) according to claim 12, further comprising, when a first EPC is not detected and a second EPC is detected, determining an object exit, and eliminating an object corresponding to said second EPC stored from the file.

16. A device with a RFID (Radio Frequency Identification) window that couples to a structure configured to house a container, wherein the device comprises:
a frame that comprises:
a window horizontally crossed by a plurality of light rays coming from a light curtain;
an infrared sensor located on a side of a framework of the window;
an RFID reader connected to at least two UHF (Ultra High Frequency) or SHF (Super High Frequency) antennas, wherein the at least two UHF or SHF antennas are located on opposite sides of the framework of the window and are inclined with an angle α over the frame, and wherein the radiation beams of the at least two UHF or SHF antennas cover a space of the window; and
a processor connected to the infrared sensor, to the light curtain, and to the RFID reader;
wherein:
the infrared sensor is configured to detect at least one object that approaches the window;
the at least two UHF or SHF antennas are configured to be activated when the infrared sensor detects the at least one object that approaches;
the RFID reader is configured to detect and identify EPCs (Electronic Product Code) contained in RFID tags incorporated in objects that enter or leave the container through the window; and
the light curtain is configured to detect any object that passes through it, and the processor is configured to store objects that stay within the container in an electronic shopping list.

* * * * *

UNITED STATES PATENT AND TRADEMARK OFFICE
CERTIFICATE OF CORRECTION

PATENT NO. : 10,073,996 B2
APPLICATION NO. : 15/690706
DATED : September 11, 2018
INVENTOR(S) : Javier Ferrer Alós et al.

It is certified that error appears in the above-identified patent and that said Letters Patent is hereby corrected as shown below:

In the Claims

Column 21, Line 15, Claim 10, delete "t" and insert -- $\alpha$ --

Column 21, Line 20, Claim 10, delete "reader," and insert -- reader; --

Signed and Sealed this
Fifth Day of February, 2019

Andrei Iancu
*Director of the United States Patent and Trademark Office*